United States Patent
Odinokov et al.

(10) Patent No.: US 12,441,470 B2
(45) Date of Patent: Oct. 14, 2025

(54) METHOD FOR DELIVERING LIQUID BY EJECTING A CONTINUOUS JET AND SYSTEM FOR IMPLEMENTING SAID METHOD

(71) Applicant: IONOS S.M.P.C., Crete (GR)

(72) Inventors: Sergey Odinokov, Vilnius (LT); Stylianos Christodoulou, Heraklion (GR)

(73) Assignee: IONOS S.M.P.C., Crete (GR)

( * ) Notice: Subject to any disclaimer, the term of this patent is extended or adjusted under 35 U.S.C. 154(b) by 132 days.

(21) Appl. No.: 18/283,847

(22) PCT Filed: Mar. 22, 2022

(86) PCT No.: PCT/IB2022/052616
§ 371 (c)(1),
(2) Date: Sep. 25, 2023

(87) PCT Pub. No.: WO2022/201031
PCT Pub. Date: Sep. 29, 2022

(65) Prior Publication Data
US 2024/0166351 A1    May 23, 2024

(30) Foreign Application Priority Data
Mar. 25, 2021   (LT) ...................... 2021511

(51) Int. Cl.
*G05D 1/00*   (2024.01)
*A01M 7/00*   (2006.01)
(Continued)

(52) U.S. Cl.
CPC ............ *B64D 1/18* (2013.01); *A01M 7/0042* (2013.01); *B05B 1/30* (2013.01); *B05B 13/005* (2013.01);
(Continued)

(58) Field of Classification Search
CPC ...... B64D 1/18; A01M 7/0042; B05B 13/005; G05D 1/49; G05D 1/6445; G05D 1/648;
(Continued)

(56) References Cited

U.S. PATENT DOCUMENTS

| | | | |
|---|---|---|---|
| 2019/0031346 A1* | 1/2019 | Yong | ........................ G08G 5/59 |
| 2020/0246819 A1* | 8/2020 | Odinokov | ........... A01M 7/0042 |
| 2020/0329690 A1 | 10/2020 | Chapple et al. | |

FOREIGN PATENT DOCUMENTS

| | | | | |
|---|---|---|---|---|
| CN | 107128484 A | | 9/2017 | |
| EP | 3708001 A1 * | | 9/2020 | .......... A01M 7/0089 |
| WO | 2017/094842 A1 | | 6/2017 | |

OTHER PUBLICATIONS

International Search Report and Written Opinion of International Application No. PCT/IB2022/052616 mailed Jun. 20, 2022, 10 pgs.

* cited by examiner

*Primary Examiner* — Aniss Chad
*Assistant Examiner* — Hussam Aldeen Alzateemeh
(74) *Attorney, Agent, or Firm* — Notaro, Michalos & Zaccaria P.C.

(57) ABSTRACT

The invention is intended for organizing the process of targeted delivery of small doses of liquid chemical treatment agents from unmanned aerial vehicles, for example, in precision agriculture or animal husbandry. Delivery of the required dose of liquid chemical treatment agents to the required application area by series of one or more targeted ejections of a continuous, and optimally laminar, jet from the unmanned aerial vehicle in flight, according to the method and/or delivery system according to the invention, is performed without significant deflection of the liquid and its losses outside the application area compared to known methods and spraying devices, and, therefore, more environmentally friendly and economical; and the application (Continued)

system has a minimal negative impact on the application areas and ensures the motion of unmanned aerial vehicles along optimal and safe routes.

20 Claims, 8 Drawing Sheets

(51) Int. Cl.
| | |
|---|---|
| *B05B 1/30* | (2006.01) |
| *B05B 13/00* | (2006.01) |
| *B64D 1/18* | (2006.01) |
| *G05D 1/49* | (2024.01) |
| *G05D 1/644* | (2024.01) |
| *G05D 1/648* | (2024.01) |
| *G05D 1/661* | (2024.01) |
| *G05D 1/689* | (2024.01) |
| *B64U 10/14* | (2023.01) |
| *B64U 101/45* | (2023.01) |
| *G05D 107/20* | (2024.01) |
| *G05D 109/25* | (2024.01) |

(52) U.S. Cl.
CPC .............. *G05D 1/49* (2024.01); *G05D 1/6445* (2024.01); *G05D 1/648* (2024.01); *G05D 1/661* (2024.01); *G05D 1/689* (2024.01); *B64U 10/14* (2023.01); *B64U 2101/45* (2023.01); *B64U 2201/20* (2023.01); *G05D 2107/21* (2024.01); *G05D 2109/254* (2024.01)

(58) Field of Classification Search
CPC .... G05D 1/661; G05D 1/689; G05D 2107/21; G05D 2109/254; G05D 1/46; G05D 1/686; G05D 7/0635; G05D 2105/31; B64U 10/14; B64U 2101/45; B64U 2201/20
USPC ............................................................ 701/2
See application file for complete search history.

METHOD FOR DELIVERING LIQUID BY EJECTING A CONTINUOUS JET AND SYSTEM FOR IMPLEMENTING SAID METHOD

CROSS-REFERENCE TO RELATED APPLICATIONS

This application is a national phase entry under 35 U.S.C. § 371 of International Application No. PCT/IB2022/0052616, filed on Mar. 22, 2022, which claims the benefit of Lithuanian Patent Application No. 2021 511, filed on Mar. 25, 2021. The contents of these applications are hereby incorporated by reference herein in their entireties.

FIELD OF THE INVENTION

The invention is related to the field of agriculture, forestry and animal husbandry, namely, to methods and systems for delivering liquid by ejecting a directed liquid jet from an unmanned aerial vehicle, wherein the jet is reaching the object for application in the form of a continuous liquid jet or in the form of giant droplets, formed during the break-up process of the continuous jet. Method and system are intended for applying to fruit trees, shrubs, palm trees and other plants, applying to agricultural areas, forest lands or other areas, as well as for treatment or protection of animals.

The invention can be used for targeted delivery of doses of single- or multicomponent liquids, suspensions, sols and liquid gels in precision farming and animal husbandry systems, including means for control of harmful insects, animal pests and parasitic plants, as well as liquid means for marking or treatment of animals, and for processing of civil, infrastructural, military objects, both stationary and mobile.

BACKGROUND OF THE INVENTION

The harvest of fruit trees suffers from fruit flies and other insects that eat their inflorescences and fruits, or lay eggs or larvae in them, damaging the fruits from the inside. Bacteria and fungi penetrate into the fruit through the damaged areas, causing further damage to the fruit and negatively affecting both the yield and the quality of the final product. Insecticides are used to control insects, directly or as components of baits.

Ticks, flies and other insects also affect livestock—they reduce milk yield, peter animals and carry dangerous diseases. Both insecticides and repellents are actively used in animal husbandry to control them. Spraying is carried out manually, by passing animals through a frame sprayer, as well as by sprayers combined with a feeder.

However, there are no known solutions for applying repellents and insecticides to free-moving objects, for example, grazing animals. Application from low-flying drones is problematic, since animals are instinctively afraid of noisy devices. Spraying from an altitude would be associated with low efficiency and environmental pollution.

Pesticides, insecticides and other chemical control agents against harmful insects, fungi and plants are also dangerous for the entire flora and fauna of the environment they fall into. The main method of applying pesticides is spraying liquid mixtures. This method is characterized by the drift of sprayed aerosols from processed plants or territories, the ingress of a part of the sprayed mixture onto the ground, the leakage of nozzles or other elements of the spraying devices, the settling of aerosol droplets on the elements of the spraying device or its carrier (ground or aerial vehicle), as well as waste water from the sites where cleaning and washing of the spraying devices and their carriers is performed. It should be noted that the agricultural sector is characterized by high mortality from pesticides and toxic substances, which indicates the insufficiency of existing safety measures.

Practice shows that modern insecticides should be applied in small doses, for example, when applying to olive trees, they proceed from units to tens of milliliters per tree. In view of the trend towards the environmental friendliness of the final products (eco or organic products), new agents are appearing with less and less dosage. The application of such small amounts requires development of special methods, since standard solutions based on spraying devices become ineffective.

For example, spraying from unmanned aerial vehicles is associated with the inevitable drift of droplets by the wind and air flows created by the propellers of the device itself. Since the required dosage is low, any drift during spraying leads to a significant loss of active agents and environmental pollution. Increasing the size of aerosol droplets, for example, from 60 to 700 micrometers, only partially solves this problem, but leads to new ones—existing nozzles begin to drip (leak), the exact dosage becomes more complicated.

The application of small doses of pesticides from unmanned aerial vehicles also faces the problem of a strong downward air flow created by the propellers of vehicle itself. This flow creates an excessive load on the tree trunk and branches, it can knock down ripe fruits and pushes the crown apart, increasing the probability of getting the working substance (active composition) onto the ground. Ripe fruits are easily separated from the plant, and since an active control, for example, against fruit flies, is conducted particularly at the stage of fruit ripening, such flows lead to a significant loss of yield.

Some reduce the concentration of active agents by diluting them in more water. However, since molasses syrup or its analogues are often used as bait, its excessive dilution reduces its stickiness and leads not only to a decrease in application efficiency, but also to an increase in the number of applications per season, being neither environmentally friendly nor economically efficient.

Increasing the flight altitude in order to reduce the impact of the descending air flow on the crown of trees leads to an increase in the drift of sprayed substances, their loss and environmental pollution.

Propellers cause vertical vortex flows, which are leading to partial capture of aerosol droplets, contamination of part or all of the unmanned aerial vehicle, as well as to an increase in drift range of sprayed substances.

Nozzles for mass agricultural equipment are standardized according to the size of the generated droplets, depending on the operating pressure of the liquid. There are systems for coding nozzles according to the size of the produced droplets, such as ASABE-S572.1, from "extremely fine" with a droplet diameter of less than 60 micrometers to "ultra coarse" with a droplet diameter of more than 665 micrometers. There is no group with a droplet size from 4 mm to 6 mm, while droplets of this particular size are recommended for processing fruit trees with poisonous insecticide baits, such as SUCCESS™ 0.24 CB or GF-120™ NF from the manufacturer Corteva AgriSciences, which recommends users to modify standard nozzles with outlet diameter from 1 to 3 mm to get out of the situation.

Thus, reducing the loss of hazardous chemicals, control of leaks and environmental pollution are important environmental and economic challenges.

For the tasks of precise targeted delivery of small doses of liquid substances to stationary and/or mobile objects from an unmanned aerial vehicle, the spraying method is unacceptable, therefore, there is a need for delivering liquid means that are not spraying devices.

A good alternative to spraying is the use of continuous jets. A continuous jet, due to the capillary wave, that inevitably arises on its surface, finally breaks up into separate droplets with a diameter usually exceeding the diameter of the jet itself. The phenomenon of breaking continuous jets up is described by the Plateau-Rayleigh instability theory. The resulting droplets, due to their massiveness, are little susceptible to a drift by wind. Due to the relatively low speed of motion, compared to spraying, these droplets usually do not have time to break up into smaller ones on the way to the application object.

The distance from the source at which the continuous jet breaks up into individual droplets is mainly determined by the quality of its laminarity. The more laminar the jet, the longer the jet remains continuous. Continuous, and especially laminar, jets are resistant to gusts of not strong wind, have excellent repeatability of the shape and trajectory from ejection to ejection and are guaranteed to deliver liquid to the desired point in space without any significant deflection. The laminar jet does not suck in air and does not form an aerosol, it is a continuous homogeneous body. For example, a laminar jet ejected upwards at an angle to the horizon resembles a parabolically curved rod with the top up, retains its continuity at a considerable distance from the source of the jet ejection at least to the upper point of the trajectory, and often in its descending part below the level of the outlet of the source of laminar jet.

The laminar continuous jet, ejected upwards at an angle to the horizon, allows to deliver liquid along a ballistic trajectory onto or into an object significantly distanced horizontally from the jet source.

The interruption of a continuous jet forms a segment of a liquid rod of a known cross-section and length, and, consequently, volume, freely flying in air, which at some distance from the source breaks up into a group of giant droplets of similar size flying one after another.

Sources of laminar jets, often called laminar flow generators as well as interrupters for them are used in fountains and are described in a number of patents: U.S. Pat. No. 8,177,141B2; US2011073670A1; US2016121357A1; U.S. Pat. No. 8,333,331B1; 4,795,092A; EP1153663A2; US2003010836A1; U.S. Pat. No. 9,744,471B1; JPH09314009A; U.S. Pat. Nos. 5,641,120A; 5,927,320A; 6,676,031B2; 6,752,373B1; etc.

Many of them are designed to work with open systems (open tanks) and are unsuitable for use in application of insecticides and similar liquids.

In patent documents U.S. Pat. No. 9,265,204 B2 and US2017020087A1, a device for watering with jets is connected to a system, comprising an image sensor that constantly monitors the condition of lawns or plants.

In particular, US2017020087A1 describes an irrigation system by a ground robot (unmanned vehicle), equipped with water tank and a continuous water jet generator; wherein the generator is equipped with a rotary device with possibility of changing the direction of the jet ejection. The system comprises the above image sensor with a lens system for capturing images of irrigation area, a control station and a refilling station. The robot has a battery charging port and a refilling port for refilling with liquid from the refilling station, as well as a flow meter for measuring the flow or amount of liquid for irrigation.

Such a system is intended only for ground execution. Robot (unmanned vehicle) is not intended for pulsed ejection of small doses of liquid and for a jet with the required parameters. The jet is interrupted by a shut-off valve at the generator inlet, resulting in liquid losses during transient processes. There is no optimization of the route from object to object, from target to target. The break for charging energy sources in the unmanned vehicle itself is quite long and has a negative effect on the application rate.

Processing of moving objects is associated with additional difficulties unknown spatial coordinates of objects, as well as the problem of determining which object from the group has already been treated and which has not.

Existing stationary methods and devices for treatment of animals with insecticides and repellents (for example, U.S. Pat. Nos. 3,699,928A, 3,602,199A, WO0057693A1, U.S. Pat. No. 3,496,914A, WO9006675A1, US2011120385A1, RU2558970), as well as stationary feeders combined with a sprayer (for example, U.S. Pat. No. 9,339,009B1, JPH09107837A, etc.), are unsuitable for applying to freely grazing animals. Existing solutions for the treatment of animals with repellents are often based on the generation of fog using diesel fuel (for example RU2595831; RU2724462C1, etc.). Such solutions are dangerous for the environment and are not economically optimal.

SUMMARY OF THE INVENTION

The proposed technical solution is intended to solve such a problem as providing targeted delivery of small doses of liquid agents, for example, liquid poisoned insecticide baits, repellents or color markers, to apply to objects or targets, such as fruit trees, palms, shrubs or animals, in a way that excludes the ingress of liquid to third-party objects or to the environment surrounding these objects, as well as reducing the impact of an unmanned aerial vehicle, transporting a device for delivering liquid to the objects or targets themselves.

The technical objective of the invention is to create reliable means for providing remote targeted delivery of small doses of liquid to the application objects from unmanned aerial vehicles in a way, different from the known spraying systems and superior to them in environmental friendliness and economic efficiency.

To overcome the above problems and solve the technical objective, a complex technical solution is proposed, characterized by a set of features set out in the Claims.

Method for delivering liquid by ejecting a continuous jet according to present invention comprises:
  obtaining information about a processing site;
  determining application areas based on the obtained information about the processing site;
  delivering liquid by controlled ejection of continuous jet onto determined application areas from an unmanned vehicle directed to them;
  maintenance of the unmanned vehicle by a service infrastructure.

In the method as proposed:
  obtaining information about the processing site is comprising formation of a nonempty plurality of reference objects, regarding which a nonempty set of application areas and, accordingly, a nonempty set of application targets are determined;
  for each application target a group of application parameters is specified, and, depending on the application target and parameters specified for it, a nonempty set of application trajectories with series of controlled ejections of directed continuous liquid jet is determined;

processing of application targets in accordance with the specified application parameters is performed by series of controlled ejections of directed continuous liquid jets from unmanned aerial vehicle in motion along the selected application trajectory;

maintenance of the unmanned aerial vehicle is comprising placement of the unmanned aerial vehicle awaiting departure or having completed its flight in standard or emergency procedure at a waiting site.

The reference objects in the proposed method are characterized by their spatial position and orientation or by spatial area of their possible location in a coordinate system of global or local navigation system; wherein for each target the application trajectory with a constant heading speed of said unmanned aerial vehicle along it, and, optimally, rectilinear, is selected from said set of possible application trajectories of that target; said application parameters are comprising a dose of liquid and one or both of the jet phase(s), acceptable for delivering said dose onto the target, wherein the phase(s) is(are) selected from the group comprising a continuous jet phase and a phase of giant droplets formed in the break-up process of the continuous jet phase; and the directed continuous jet, optimally, is laminar.

Processing of application areas is performed by one or more unmanned aerial vehicles, each equipped with one or more liquid storage tanks and one or more generators for controlled ejection of a directed liquid jet, providing liquid for said generators from the respective tank(s), wherein during the motion of unmanned aerial vehicle along target application trajectory angular stabilization is provided in one or more planes by controlling the attitude of unmanned aerial vehicle carrying them and, optionally, by configuring of additional gimbals, by means of which the controlled ejection generator(s) is(are) mounted on the unmanned aerial vehicle.

Said reference objects, relative to which a nonempty set of application targets for processing by one of unmanned aerial vehicles, singly or in groups, is(are) determined and, optionally, is(are) further tracked according to images from an image sensor and/or a range (TOF, Time-Of-Flight) image sensor installed on the unmanned aerial vehicle, with determining for unmanned aerial vehicle and each reference object their mutual position and mutual orientation.

Said group of target application parameters is further supplemented in such a way, that for an application target, which is a line of any finite length, including zero, a given dose of liquid is distributed along its length by specifying an absolute amount of liquid at one or more of its points, or for an application target of any non-zero finite length a given dose of liquid is distributed along its length by specifying the amount of liquid per unit length for each point of the target, wherein the given dose is provided by configuring and, optimally, controlling the flow of liquid, ejected into the target and controlling the time of ejection of each jet from series of jets.

In one of embodiments said reference objects and/or application targets, defined relative to them, are marked with marker substances prior to application; said unmanned aerial vehicle being equipped with means for detecting the presence of marker substances on the reference object and/or target, and group of application parameters is supplemented with an indicator of the need for processing, when detecting the marker substance on the target and/or reference object, with respect to which it is determined, wherein liquid itself is used as the marker substance, if its presence on the reference object and/or target is detectable with said means for detecting the presence of marker substances, or the marker substances are added to the liquid.

Said target application trajectory is determined by a segment of continuous line in space, at each point of which mutual position and mutual orientation of said unmanned aerial vehicle and said target, and a direction of the jet ejection are provided, which together ensure the target being reached by the jet in any of the jet phases specified by the application parameters.

A number of jets in target application series is determined by considering guaranteed time of stable continuous operation of said controlled ejection generator(s) and the presence of obstacles on the way to the target of one calculated continuous jet, providing target processing according to the specified application parameters from said unmanned aerial vehicle moving along the target application trajectory.

The motion of unmanned aerial vehicle along the target application trajectory is defined as application state; the motion of the unmanned aerial vehicle between the application trajectories is defined as transit state, and other motions are defined as maintenance state, and the presence of unmanned aerial vehicle in a stationary state on one of the service sites is defined as idle state.

A sequence of unmanned aerial vehicle states, beginning and ending with the idle state, determines the route of the unmanned aerial vehicle, and according to application states comprising the route, the set of targets corresponding to the route is determined, wherein for each unmanned aerial vehicle in the maintenance state preceding first application state, the amount of liquid corresponding the route in its liquid storage tank(s) is prescribed to be provided by directing the unmanned aerial vehicle to one of the refilling sites, and energy level in replaceable energy sources corresponding the route is prescribed to be provided by directing it to one of the energy sources replacement sites.

Processing of nonempty set of targets is performed by one or more unmanned aerial vehicles during one session, comprising of one or more routes, each being assigned for processing a subset of targets by one of unmanned aerial vehicles, by including appropriate application states in its route.

When generating session routes for unmanned aerial vehicle equipped with two or more controlled ejection generators, application trajectories are selected from a set of possible application trajectories, that are combined into a continuous linear part of the route with a constant heading speed of the unmanned aerial vehicle along it, and, optimally, rectilinear.

In the optimal embodiment of the method for a route with two or more application states such application trajectories are selected from a set of possible application trajectories, that are capable to fit into the shortest and straightest route, optimally, with a constant heading speed of the unmanned aerial vehicle along its longest part.

For unmanned aerial vehicle on its last route in the session in the maintenance state, following the last application state, direction of unmanned aerial vehicle is prescribed towards one of the refilling sites for draining residual liquid from liquid storage tank(s) and/or rinsing of liquid storage tank(s) and, optionally, of controlled ejection generators.

In a possible embodiment of the proposed method, for session of processing a nonempty set of application targets, determined relative to stationary reference objects, by one or more unmanned aerial vehicles, the following is determined:

weight coefficients for the stay of unmanned aerial vehicle in each state of unmanned aerial vehicle during the selected unit of time;

amplifying multipliers for intervals of motion with acceleration;

weakening multiplier, inversely proportional to the remaining amount of unused liquid;

where delivery paths are also determined, which are collectively grouped into a plurality of routes, characterized by minimum sum over the routes of integral values over time of the product of weight coefficients by amplifying and weakening multipliers along individual routes.

The group of target application parameters is optionally supplemented with one or more restrictions, selected from the group, comprising:

azimuth range and/or an angle range between the horizon and direction of delivery of the liquid to the target;

space relative to the reference object, in which unmanned aerial vehicle is prohibited to be located; and space relative to the reference object, in which unmanned aerial vehicle is recommended to be located.

Determining of relative position of unmanned aerial vehicle and application area is characterized by difference in altitudes and horizontal distance between them, while direction of the jet ejection is characterized by the angle between the direction of jet ejection and the horizon and the azimuth of the application area relative to unmanned aerial vehicle, and using the relative position of unmanned aerial vehicle and the application area during entire time of application onto the target, a correction being determined for velocity vector of unmanned aerial vehicle relative to the application area, and, optionally, for specified or measured wind velocity vector.

Applying onto the targets set by the session is performed by distributing routes between involved unmanned aerial vehicles in such a way that the total time spent by all unmanned aerial vehicles in the idle state is minimal.

In case of emergency situation on unmanned aerial vehicle, its current route is aborted and it is directed to the nearest waiting site, or, alternatively, performing landing as safe as possible outside the service or waiting sites.

Another key object of the solution as proposed is a system for delivering liquid by a directed jet for implementing the above disclosed method, comprising:

source of information on application areas;

unmanned vehicle, equipped with a controller and carrying a device for delivering liquid by ejecting a directed jet, comprising a liquid storage tank and a generator for controlled ejection of a directed liquid jet;

unmanned vehicle service infrastructure;

control station linked to the source of information on processing sites, to unmanned vehicle controller and to the service infrastructure.

In the system as proposed:

source of information on application areas comprises information about a nonempty set of specified targets, determined relative to a nonempty set of reference objects located in the processing site, covered by the coverage area of local or global navigation system;

unmanned vehicle is one or more unmanned aerial vehicles, each being means for providing altitude and angular stabilization in one or more planes for one or more installed on said means devices for delivering liquid by ejecting a directed liquid jet during time of jet ejection by generator;

unmanned aerial vehicle controller is equipped with means for accurate navigation of the local or global navigation system and means for determination of the orientation and course, including compass or magnetometer;

device for delivering liquid is configured for series of one or more ejections of directed continuous, optimally laminar, liquid jet(s) to the target, wherein device for delivering liquid is equipped with its own delivery device controller, linked to the unmanned aerial vehicle controller and the control station, and is equipped with one or more generators for controlled ejection of liquid jet, wherein each generator is connected to a liquid storage tank by means of a controlled liquid subsystem;

control station is comprising:

means for generating of unmanned aerial vehicles routes laid through the application trajectories of each target from the set of targets;

means for controlling the motion of said unmanned aerial vehicles along the routes linked with the means for generating the routes;

linked with the means for controlling the motion means for communication with unmanned aerial vehicles controllers, with delivery device(s) controllers and, optionally, with refilling sites and/or energy sources replacement sites; wherein the service infrastructure comprises one or more service sites, comprising one or more energy sources replacement sites, one or more liquid refilling sites, one or more waiting sites, located on a common platform or distributed individually or in groups, including, optionally, in the form of multifunctional service sites, configured as a stationary and/or mobile ground station.

In an embodiment of the system proposed several jet ejection generators are connected to the tank by means of a single controlled liquid subsystem.

Said device for delivering liquid is configured for series of one or more ejections of a continuous liquid jet to the target on the corresponding the target application trajectory of the unmanned aerial vehicle route, wherein, optionally, the delivery device controller is configured to set or, optimally, to correct direction, and, optionally, the speed and duration of the jet ejection.

Liquid for application onto the target is comprising an active application agent and, optionally, a marker substance, capable of confirming the fact of delivery of liquid to the target, and unmanned aerial vehicle is optionally equipped with linked with the controller means for detecting the presence of marker substance on the reference objects and/or targets.

Means for accurate navigation and determination of orientation and course of the proposed system, further to said compass or magnetometer, are comprising an accelerometer, a gyroscope, a GNSS receiver and GNSS correction means, linked with an external source and/or means for object detection and tracking, as well as means for determining altitude.

In the embodiments of the proposed system, each of the jet generators is installed on the device for delivering liquid by directed jet by means of a vibration damper and/or gimbal for one or more angles with linking of orientation sensor unit of said gimbal to the orientation of the generator.

Also, in optimal embodiments of the invention, the outlet of the generator is equipped with the jet ejection controller, which diverts liquid, not used for ejection onto the target, into corresponding liquid storage tank. In order to avoid sedimentation or delamination, said tank is further equipped with means for stirring liquid in the tank, such as tank stirrer.

Controlled liquid subsystem of the system for delivering liquid by ejecting a directed continuous jet according to the proposed solution is equipped with liquid pump and, optionally, is equipped with pressure pulsation damper for pressure pulsations, generated by the pump.

Furthermore, the controlled liquid subsystem is further equipped with a liquid flow meter, which is a feedback sensor for the controller of the device for delivering liquid by ejecting a directed jet.

In some embodiments the tank and the controlled liquid subsystem(s) connected to it are combined into one common easily replaceable and entirely disposable unit.

Said device for delivering is equipped with means for draining and removing liquid residues from the tank, with the possibility of rinsing the tank, the liquid subsystem and, optionally, the jet ejection generator.

Device for delivering liquid by ejecting a directed jet is equipped with a fill valve, optionally combined with means for draining and removing liquid residues from the tank, wherein the fill valve can be automatic.

Refilling site is equipped with a tank for liquid for application and can be equipped with mixing reactors for obtaining a specified liquid directly at the refilling site.

Unmanned aerial vehicle of the proposed system is made in the form of a multi-rotor aerial vehicle with vertical takeoff and landing, and is configured in such a way, that the air flows, generated by the rotors of unmanned aerial vehicle in flight and the liquid jet ejected by the generator do not interfere.

In an embodiment of the proposed system, the device for delivering liquid by ejecting a directed jet is made in the form of a removable payload module, installable on the unmanned aerial vehicle.

In another embodiment, said device for delivering is integrated into the unmanned aerial vehicle, wherein, optionally, the unmanned aerial vehicle controller and the controller of the device for delivering liquid by a directed jet are combined.

The controller of the device for delivering liquid may establish prohibition for jet ejection above the specified safe altitude of the unmanned aerial vehicle motion.

The control station of the system as proposed might be of distributed structure, wherein means for generating routes of unmanned aerial vehicles are located outside the processing site, and the means for traffic control and communication means are located within the processing site.

Means for generating routes of unmanned aerial vehicles are comprising hardware and software computing resources for generating routes, optimally, a cloud or a remote relative to the processing site physical or virtual server, equipped with a network adapter, supporting known Internet protocols and connected to the Internet.

Means for traffic control are comprising hardware and software computing resources for the implementation of traffic control, optimally, an industrial computer or controller, optimally, based on an ARM microcontroller(s), equipped with a network adapter, supporting known Internet protocols and connected to the Internet.

The control station can be local, wherein all its components are combined into one functional device, located within the processing site and, optimally, made in the form of a module for refilling site or energy sources replacement site.

Unmanned aerial vehicle is equipped with the image sensor and/or range (TOF, Time-Of-Flight) image sensor for determining and subsequent tracking of reference objects with the ability to determine the mutual position and mutual orientation of unmanned aerial vehicle and the reference object.

The above method and system is a complex solution, characterized by a single inventive concept, which comprises creation of means of targeted metered delivery of liquid by a continuous jet instead of spraying insecticides and similar substances, harmful to the environment, which means are especially important in modern precision farming systems.

BRIEF DESCRIPTION OF DRAWINGS

Technical solution as proposed is explained by drawings illustrating the essence of invention, but not limiting the scope of protection.

DETAILED DESCRIPTION AND MODES OF EMBODIMENTS OF THE INVENTION

Figure 1:
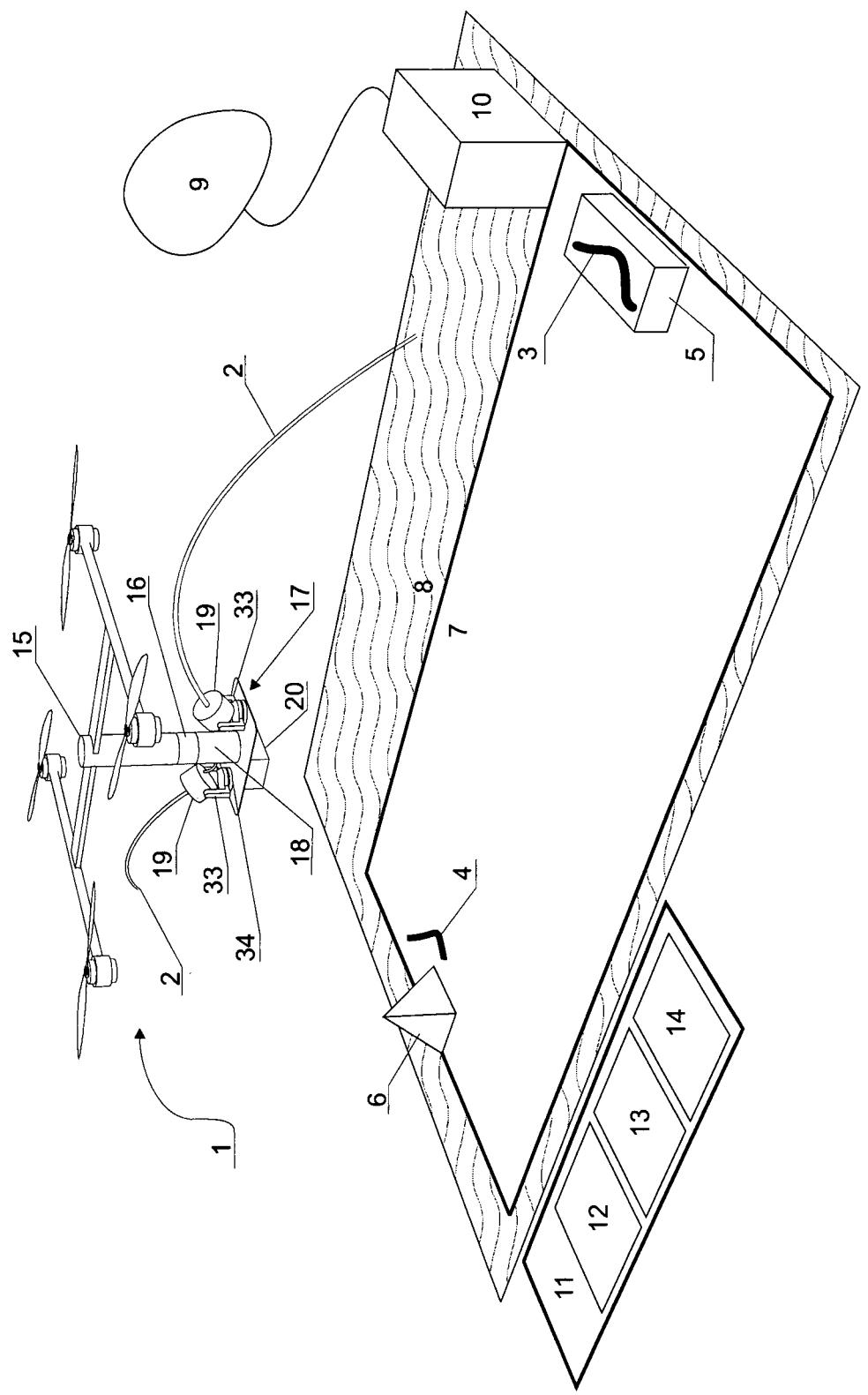
FIG. 1. Demonstrates the main components of the system.

The embodiments of the invention are examples illustrating the invention, but not limiting the scope of protection. Description of the System for Delivering Liquid by Ejecting a Continuous Jet FIG. 1 schematically shows the system for delivering liquid from unmanned aerial vehicle 1 by ejecting continuous jets 2 to the application areas 3 and 4, defined, respectively, relative to objects 5 and 6 located in the processing site 7, covered by area 8 of operation of the local or global navigation system.

In general case, liquid is delivered by one or more unmanned aerial vehicles. Application areas are considered to be targets, the spatial position and orientation of which, although determined relative to reference objects, do not necessarily have to be located on them or in them.

The source of information 9 about the application areas forms a non-empty set of targets for application and provides it to the control station 10.

The processing of targets is performed in sessions comprising all the necessary steps from determining targets for application to landing unmanned aerial vehicles and their final maintenance after application. The session can involve one or more unmanned aerial vehicles, and in order to maintain them during the session the service infrastructure 11 is defined, which comprises service sites, namely one or more waiting sites 12, one or more refilling sites 13, and one or more energy sources replacement sites 14, located on a common platform or distributed individually or in groups, including, optionally, in the form of multifunctional service sites configured as a stationary and/or mobile ground station. The service sites can be located both in the processing site and outside of it.

Taking into account the involved unmanned aerial vehicles 1, specified service sites and information about a non-empty target set, and using the means for generating unmanned aerial vehicles routes, the control station 10 generates routes for the involved unmanned aerial vehicles 1; as well using the means for traffic control of unmanned aerial vehicles, engages in dispatching their motion both along the routes and in emergency situations. The means for traffic control of the unmanned aerial vehicles are equipped with communication means with unmanned aerial vehicles, and since the service infrastructure 11 can be partially or fully configurable and/or automated, connection is also provided to the service sites of service infrastructure 11. The control station 10 of the system might of be distributed structure, wherein the means for generating of routes of unmanned aerial vehicles are located outside the processing site 7, and the means for traffic control and communication means are located within the processing site 7.

In the standard embodiment the means of generating routes of the unmanned aerial vehicles comprise hardware and software computing resources for generating routes, optimally, a cloud or a remote relative to the processing site 7 physical or virtual server, equipped with a network adapter, supporting known Internet protocols and connected to the Internet.

In the standard embodiment the means for traffic control comprise hardware and software computing resources for implementation of traffic control, optimally, an industrial computer or controller, optimally, based on an ARM microcontroller(s) equipped with a network adapter that supports known Internet protocols and connected to the Internet.

In one of minimal embodiments the control station 10 is local, wherein all the components are combined into one functional device located in the processing site and, optimally, made in the form of a module for refilling site or energy sources replacement site.

The optimal embodiment is based on wireless communication in the ISM radio band or on mobile communication networks, optimally, 5G and/or 4G networks. Accordingly, the communication means of the control station comprise the corresponding modems and/or communication modules.

The unmanned aerial vehicle 1 comprises propulsion system 15 and controller 16 and carries one or more devices 17 for delivering liquid by ejecting a directed liquid jet 2. Each device 17 for delivering liquid comprises a liquid storage tank 18 and one or more generators 19, connected to the tank by a liquid subsystem 26, for controlled ejection of a directed jet.

The unmanned aerial vehicle 1 receives energy from one or more replaceable energy sources 20, which installation on unmanned aerial vehicles 1, as well as the replacement of partially or fully discharged energy sources with charged ones, is performed at the energy sources replacement sites 14. The unmanned aerial vehicle 1 controller is linked to the control station 10 and, optionally, to the source of information 9 on targets (application areas). The optimal embodiment of the link is based on wireless communication in the ISM radio band or on a suitable mobile communication network, optimally, 5G and/or 4G. Accordingly, the unmanned aerial vehicle controller comprises the corresponding modems and/or communication modules.

Figure 2:
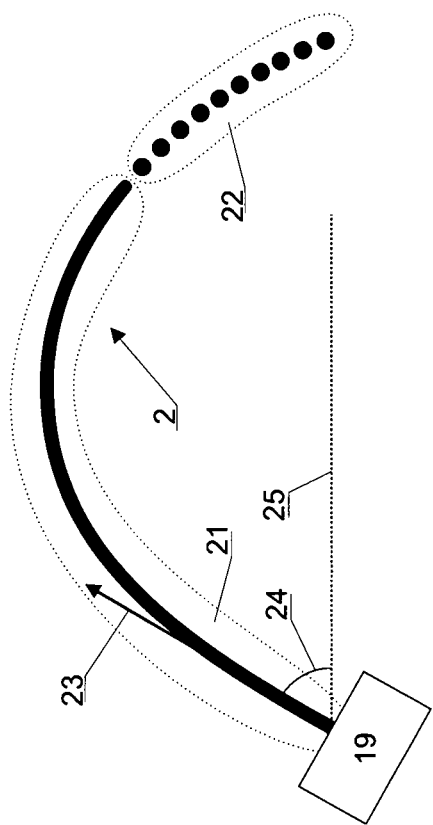
FIG. 2. The ejection of a free continuous liquid jet 2 from the generator 19 along a ballistic trajectory at an angle 24 to the horizon 25 and the sequence of jet phases are shown: from the continuous jet phase 21 to the giant droplet phase 22.

The controlled ejection generator 19 forms and ejects for a certain time a free continuous, optimally, laminar, liquid jet 2, which, in the course of its motion from generator 19, passes from the continuous jet phase 21 to the phase 22 of giant droplets formed in the break-up process of the continuous jet phase 21, which is schematically shown in FIG. 2. The ballistic trajectory of the free liquid jet 2 is determined by the spatial position of the generator 19 and the velocity vector 23 of liquid jet ejected by the generator 19, in particular, by the angle 24 of inclination of this vector to the horizon 25. The phenomenon of breaking-up of continuous jet is described by the Plateau-Rayleigh instability theory, according to which droplets of similar size are formed, which characteristic diameter exceeds the diameter of the breaking-up jet. For example, a jet with diameter of 7 mm breaks up into droplets with diameter of about 9 mm. Deflection of droplets is determined mainly by the mass of droplets—the heavier the droplet, the less deflection. Standard nozzles of spraying systems are designed to form droplets with diameter of up to 0.7 mm and mass of up to 0.18 mg, while the possible implementation of the generator 19 is capable of ejecting jet that breaks up into identical droplets with size of 7 mm and mass from 180 mg, or 1000 times heavier.

By controlling the mutual position of the target 3, 4 and the generator 19, as well as the jet ejection velocity vector 23, the liquid reaches the target 3, 4 in a certain phase of the jet—either in the continuous jet phase 21 or in the giant droplet phase 22.

Figure 3:
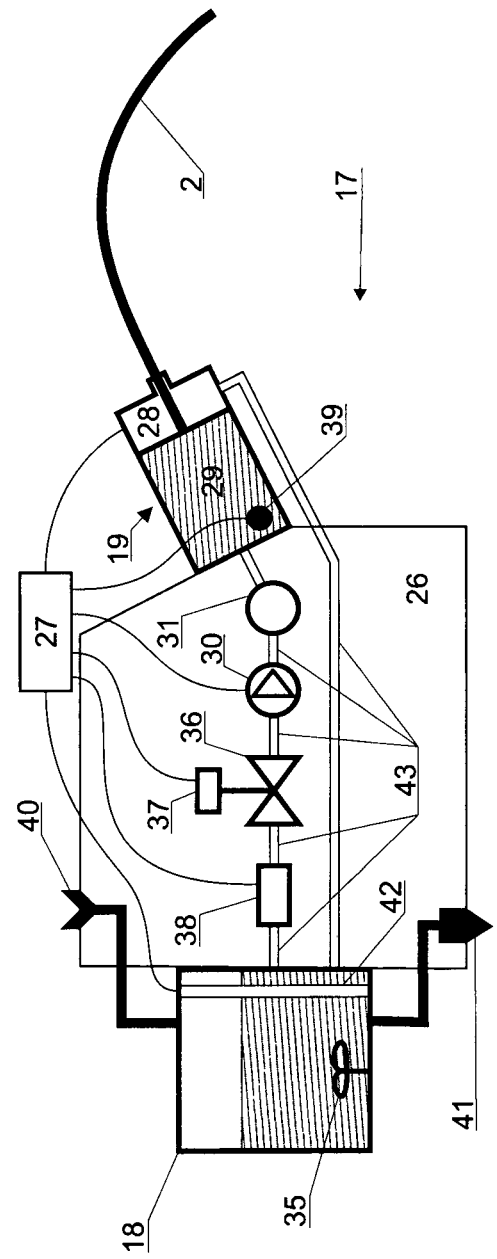
FIG. 3. Schematic view of the device 17 for delivering liquid with specification of the liquid subsystem 26 and the tank 18.

FIG. 3 shows in more detail the possible embodiment of the device 17 for delivering liquid. The generator 19 is connected to the tank 18 by means of a liquid subsystem 26. There are also embodiments of the device 17 for delivering liquid, wherein two or more generators 19 are connected to the tank 18 by one liquid subsystem 26.

The device 17 for delivering liquid is also comprising its own controller 27, linked to the unmanned aerial vehicle 1 controller 16, the control station 10 and, optionally, to the source 9 of information on objects for application (targets). To ensure a high level of environmental safety, controller 27 of the device 17 for delivering liquid is able to prohibit the jet ejection from the altitude above the limit established by the regulations for use of unmanned aerial vehicles for the delivery of liquids, for example, according to "Acceptable Means of Compliance (AMC) and Guidance Material (GM) to Commission Implementing Regulation (EU) 2019/947" and "DIRECTIVE 2009/128/EC OF THE EUROPEAN PARLIAMENT AND OF THE COUNCIL".

In the optimal embodiments of the device 17 for delivering liquid, the generators 19 are equipped with jet ejection controller 28 with draining of the liquid not used for ejecting to the target back to the tank 18 by means of the corresponding liquid subsystem 26 (see FIG. 3).

The jet ejection controller 28 allows to degas the liquid subsystem 26 and the generator 19, as well as to stabilize the liquid flow at the required value immediately before ejecting liquid jet 2, that significantly reduces the loss of liquid outside the target 3, 4 and increases the accuracy of delivering liquid to the target 3, 4.

Means for reducing liquid turbulence and/or aligning liquid flow 29 are installed into generator 19 of the laminar jet 2 and, optionally, into generator 19 of the non-laminar jet 2, which can be of any (known) type, for example, a series of hemispherical mesh filters.

The liquid subsystem 26 is equipped with means for supplying liquid to the generator, for example, a pump 30. The pump 30 can be of any type, but, optimally, it should create minimal pressure pulsations at its outlet, since they negatively affect the quality of the formation of a continuous jet 2. The optimal types of the pump 30 are centrifugal with a high speed of rotation, piston or syringe. In order to reduce pressure pulsations, the pressure pulsation damper 31 is optionally installed between the means of supplying liquid 30 and generator 19. As an alternative to the pressure pulsation damper 31 or in addition to it, an air cavity of a specified or controlled volume inside the generator 19 can be provided.

Figure 4:
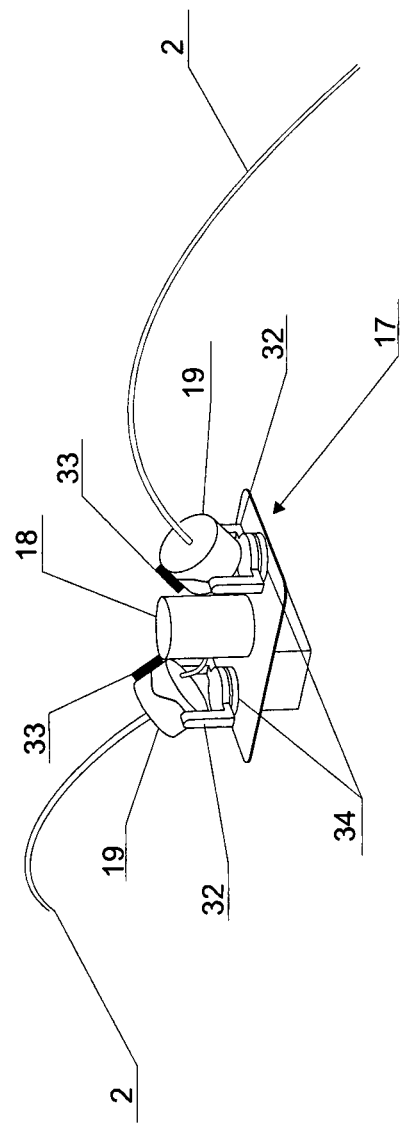
FIG. 4. An example of installation of generators 19 on the device 17 for delivering liquid by means of dimensional gimbals 32 and vibration dampers 34. The attitude sensors units 33 of the gimbals are installed on the corresponding generators 19.

Quality of formation of the continuous jet 2 is also affected by mechanical vibrations transmitted to the generator 19, so the unmanned aerial vehicle 1 provides not only a smooth motion of the generator 19 during the jet 2 ejection, but also stabilizes at least one angle of the vector 23 of the jet 2 ejection. In optimal embodiments of the device 17 for delivering liquid, the generators 19 are installed on the device 17 for delivering liquid by means of additional dimensional gimbals 32 for one or more angles with linking of orientation sensors unit 33 of said dimensional gimbal 32 to the orientation of the corresponding generators 19, as shown in FIG. 4. The installation of mechanical vibration dampers 34 between the generator and the device for delivering liquid is also provided.

The liquid can be a fluid phase of a single-component substance, a single- or multicomponent solution, a sol, or a suspension. In order to ensure homogeneity of the liquid and to avoid its delamination and sedimentation, a means 35 for stirring liquid in the tank 18 is provided.

Blocking the liquid flow from the tank 18 to the generator 19 by a controlled valve 36 with drive 37 is provided, alternatively or additionally, said valve 36 is used to regulate the liquid flow. The valve 36 is a component of the liquid subsystem, see FIG. 3.

The liquid subsystem 26 is provided with a liquid flow meter 38 linked to the controller 27 of the device 17 for delivering liquid. The flow meter readings are used in feedback of the liquid flow control process. The actuating device of the control process is means for supplying liquid, for example, pump 30 and/or a controlled valve 36 with drive 37.

The tank 18 or generator 19 is equipped with a liquid temperature sensor 39 linked to the controller 27 of the device 17 for delivering liquid, allowing correct selection of control parameters of the device 17 for delivering liquid, for example, taking into account the viscosity of the liquid that varies depending on temperature.

In some embodiments, the tank 18 is filled at the refilling site 13 through the throat 40, and draining is performed through the drain valve 41. In other embodiments, both refilling and draining are performed through universal drain and fill valve 41.

The rinsing of the tank 18, and optimally, of the liquid subsystem 26 with all generators 19 connected through it is also provided. The draining of the rinsing liquid is also performed through the valve 41. The valve 41 can be automatic.

In optimal embodiments, the tank 18 is equipped with a liquid level sensor 42 connected to the controller 27 of the device 17 for delivering liquid, see FIG. 3.

The hydraulic connections of the device 17 for delivering liquid are provided with connecting tubes 43.

In the safest embodiments, the tank 18 and the liquid subsystems 26 connected to it are combined into one common easily replaceable and entirely disposable unit of a single installation, such as described in publication WO2019/073314. The described easily replaceable and entirely disposable unit of a single installation together with the possibility of automatic refilling and rinsing of the device 17 for delivering liquid are in good agreement with the requirements of "DIRECTIVE 2009/128/EC OF THE EUROPEAN PARLIAMENT AND OF THE COUNCIL." In such embodiments, the drain, fill or drain and fill valve 41 can either be part of the replaceable unit, or be a component of the remaining part of the device 17 for delivering liquid.

Figure 5:
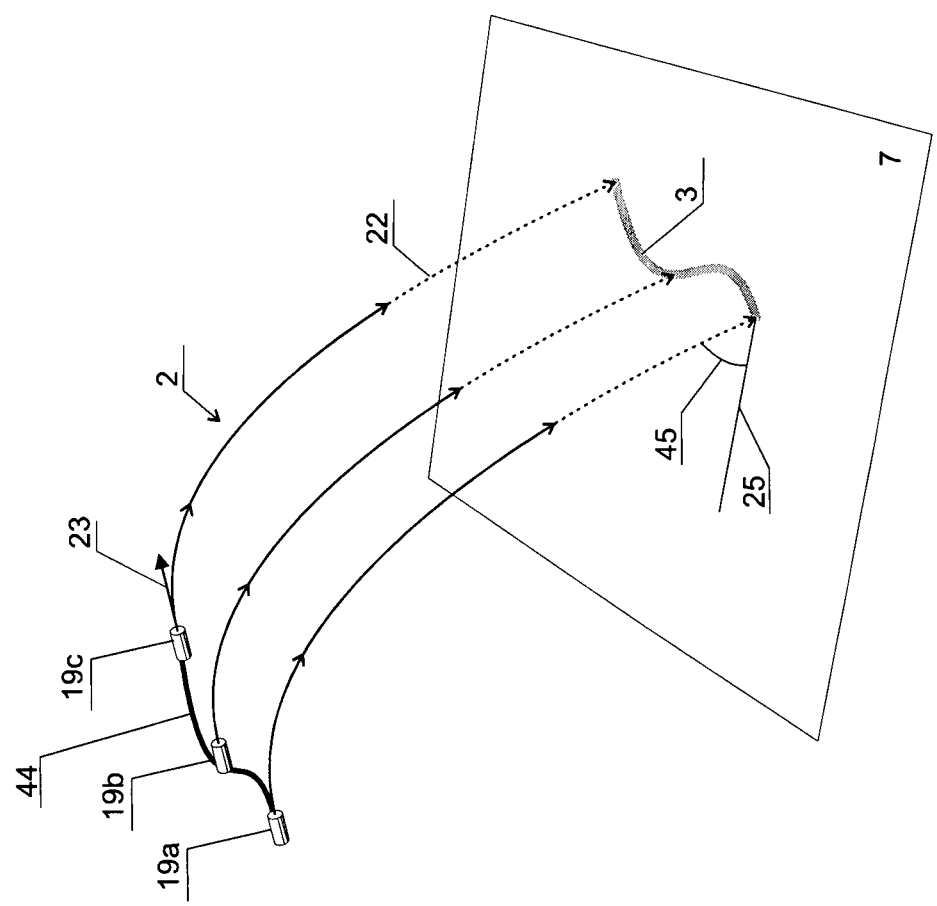
FIG. 5. Demonstrates the correspondence of the target 3 application to trajectory 44 of non-zero-length.
Figure 6:
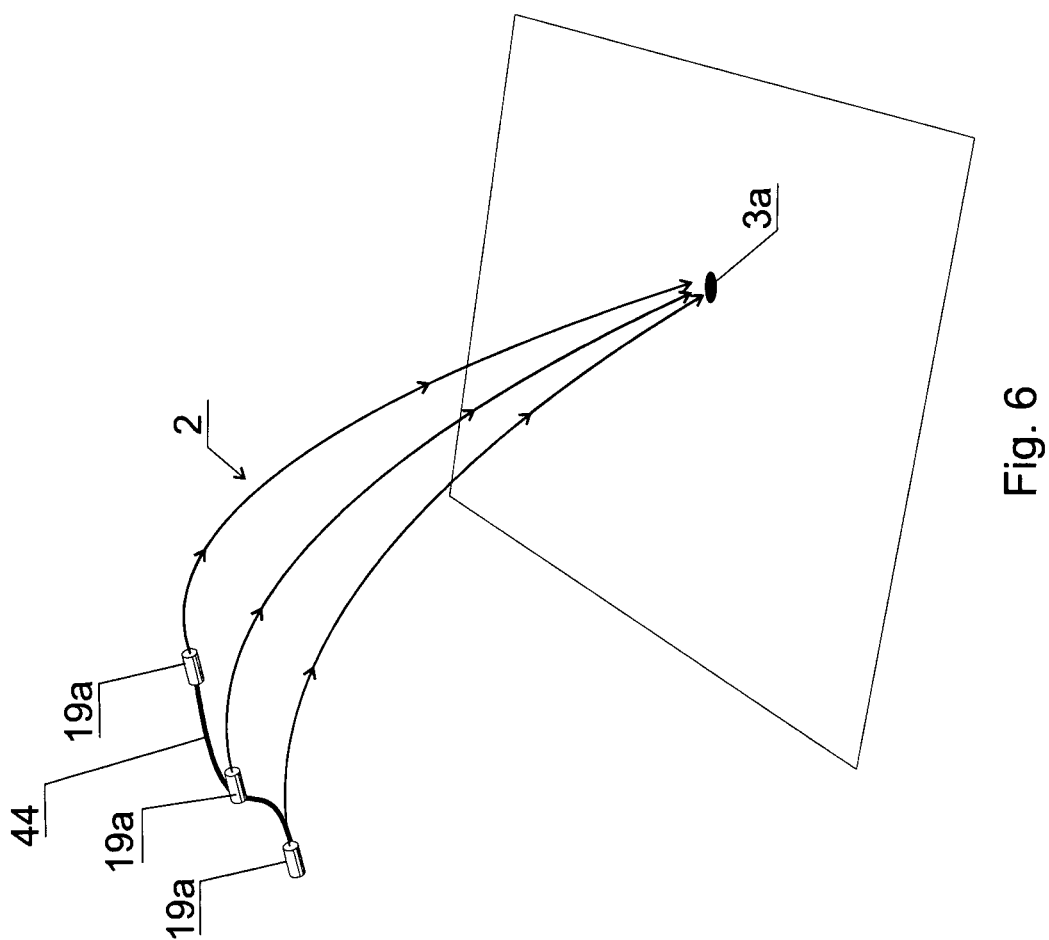
FIG. 6. Demonstrates the correspondence of the target 3 application to trajectory 44 of zero-length.

The device 17 for delivering liquid is configured for a series of one or more ejections of a continuous liquid jet 2 from the generator 19 to the target 3 (4) on the application trajectory 44 of the unmanned aerial vehicle 1, corresponding the target 3 (4), wherein optionally, the controller 27 of the device 17 for delivering liquid is configured to set or, optimally, correct, the direction, and, optionally, the speed and duration of the jet ejection. FIG. 5 schematically shows the motion of the unmanned aerial vehicle 1, represented in the figure with only one generator 19, along the application trajectory 44 of the corresponding target 3. The generator moves from the initial position 19a to the final 19b passing intermediate positions 19c. Such velocity vector 23 of ejected liquid jet 2 is maintained during the motion, ensuring delivering liquid to the line of the application target 3 in the desired liquid phase. In FIG. 5, the liquid is applied to the target 3 in the giant droplet phase 22. FIG. 6 shows a similar process, but the liquid is delivered by the continuous jet phase 21 to the target 3a of zero-length.

The controller 16 of the unmanned aerial vehicle 1 controls the propulsion system 15, which ensures the take-off, flight and landing of the unmanned aerial vehicle 1. For precise delivery of liquid to the target 3 (4) by ejecting a directed liquid jet 2, the controller 16 must ensure the exact position and orientation of the unmanned aerial vehicle 1 relative to the reference objects 5 (6). For these purposes, the controller 16 is equipped with means of accurate navigation and detecting the orientation and course. In most embodiments, the means of accurate navigation are a GNSS receiver with an appropriate antenna. For greater accuracy in determining the spatial position, the unmanned aerial vehicle 1 is also equipped with the GNSS correcting information receiver, for example, the RTK receiver. When applying to targets 3 (4) outside the zone of stable reception of signals from global satellite navigation systems, for example, in hangars, greenhouses or industrial premises, local navigation systems are used, for example, systems based on the propagation time of sound or ultrasonic waves, systems based on ultra-wideband radio signals or visual navigation systems. The unmanned aerial vehicle 1 is equipped with a corresponding navigation device. For agricultural applications, the determination of spatial coordinates with an accuracy of up to 5 cm is optimal.

Figure 7:
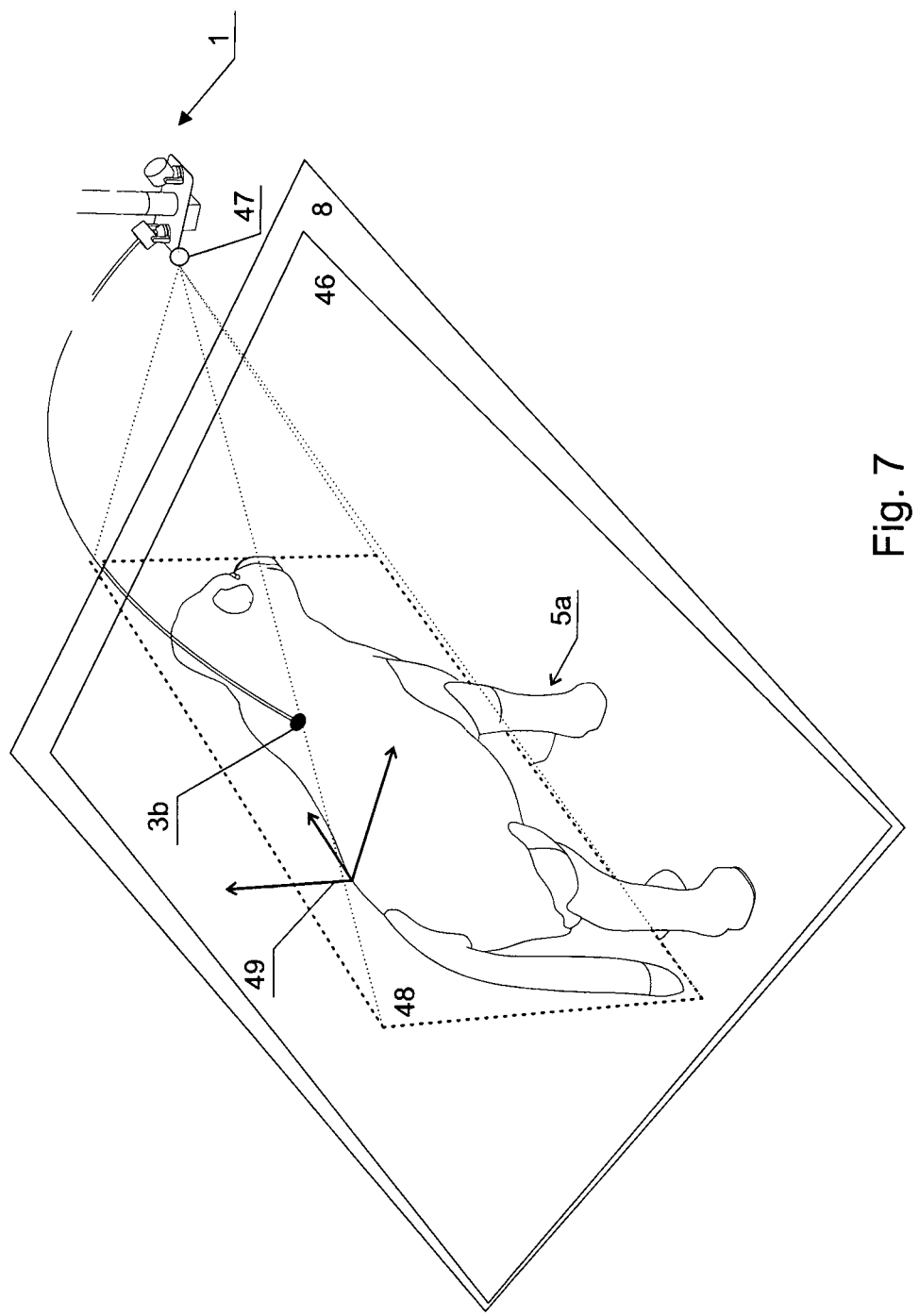
FIG. 7. Processing of target 3b on a mobile reference object.

FIG. 7. In some implementations it is necessary to detect and possibly further track the reference objects 5. For example, when applying to mobile targets 3b, such as grazing cattle 5a. The position of such reference objects 5a is limited to a predetermined mobile reference object 5a location zone 46, for example, a pasture, determined relative to the coverage area of the global or local navigation system 8, but the exact position of the object inside the zone 46 is not known. In such implementations, the unmanned aerial vehicle 1 is equipped with the means of detection and possible additional further tracking of reference objects 47. Examples of such systems are systems for visual detection and classification of objects using an image sensor in one or more spectral ranges, or range (TOF, Time-Of-Flight) image sensors. Means for detection 47 are detecting an object 5a located in the field of vision 48 of means for detection 47, and are allowing to detect and further track the position and orientation of both the target 3 and the unmanned aerial vehicle 1, relative to the reference object 5a, for example, in its local coordinate system 49.

The controller 16 of the unmanned aerial vehicle 1 is equipped with an attitude and heading reference system either in the form of a complete device connected to the controller, or as separate sensors, such as compasses or magnetometers, gyroscopes, accelerometers and, optionally, barometers and the corresponding computing process executed by the controller 16 of the unmanned aerial vehicle 1. In any case, it is necessary to have a compass or a magnetometer for orientation in the magnetic field of the planet. In the standard embodiment, all attitude and heading reference system sensors are three-axis.

In the standard embodiment the controller 16 of the unmanned aerial vehicle 1 is also equipped with sensors of the actual altitude above the surface level of the processing site 7. It is optimal to use altimeters, reporting not only the distance to the surface, but also the distance to the upper boundary of objects 5 (6) located on the surface, for example, to the tops of trees. When moving over a surface with a pre-digitized terrain, accurate navigation means can be used as an altimeter.

The unmanned aerial vehicle 1, equipped with the altimeter and an attitude and heading reference system, is a means for providing altitude and angular stabilization in one or more planes of one or more installed on said means devices 17 for delivering liquid by ejecting a directed liquid jet 2 during time of jet ejection by the generator 19.

The optimal embodiment of the unmanned aerial vehicle 1 is a multi-rotor aerial vehicle with vertical takeoff and landing, which propulsion system 15 together with the device 17 for delivering liquid installed on it, are configured in such a way that air flows, created by the rotors of the unmanned aerial vehicle 1 in flight, and the jets 2, ejected by the generators 19, do not interfere.

The device 17 for delivering liquid by a directed liquid jet 2 in some embodiments is made in the form of a removable payload module installed on the unmanned aerial vehicle 1; such modules are optimally suited for automated industrial systems of unmanned aerial vehicles. In other embodiments device 17 for delivering liquid is integrated into unmanned aerial vehicle 1 and, optionally, the controller 16 of unmanned aerial vehicle and the controller 27 of the device 17 for delivering liquid by a directed liquid jet are combined in a single controller.

The refilling site 13 is equipped with a liquid tank. In some embodiments the refilling site 13 can be equipped with mixing reactors for obtaining the specified liquid directly at the refilling site. In such embodiments, the active components of the liquid are stored in compact containers, and the components are mixed before the application session or directly during filling of the unmanned aerial vehicle 1. In cases where the activity of the liquid decreases rapidly over time, the liquid can be obtained during a chemical reaction by mixing reagents before the start of the session or directly during filling of the unmanned aerial vehicle 1.

In embodiments for mobile indistinguishable reference objects 5a, there is a need to prevent re-processing of targets 3b. In such cases, marker substance is added to the liquid for confirming the fact of delivery of liquid either onto the target or to the reference object relative to which the target is defined, and the unmanned aerial vehicle 1 is provided with means for detecting the presence of a marker substance on the target or reference object linked to the delivery device controller 27 and/or the unmanned aerial vehicle controller 16. It is not necessary to add the marker substance to the liquid, if the presence of the liquid itself on the target or on the object is detectable by said means. The optimal means for detecting the presence of a marker substance are computer vision systems in one or more ranges of the light spectrum, including the ultraviolet and the entire infrared zone. It is optimal to join or combine the means for detecting the presence of marker substance with the means for detection and possible additional further tracking of reference objects 47.

Waiting sites 12 of the service infrastructure 11 are also used for landing of unmanned aerial vehicles 1 on them in emergency situations, for example, if there is no communication between the unmanned aerial vehicle 1 and the control station 10.

In the standard embodiment of the device 17 for delivering liquid, the tank 18 is equipped with a liquid level sensor 42 linked to the controller 27 of the device 17 for delivering liquid.

Description of the Method for Delivering Liquid by Ejecting a Continuous Jet and System Operation Processing of targets 3 (4) is performed in sessions, comprising the following steps:
  determining a non-empty set of application targets;
  transmitting of data on this set of targets to the control station 10;
  allocating one or more unmanned aerial vehicle 1 for application;
  allocating service infrastructure 11;
  generating routes of unmanned aerial vehicles 1;
  dispatching the traffic of unmanned aerial vehicles 1.

The determining of a non-empty set of application targets 3(4) begins with obtaining information about the processing site 7, including determining the boundaries of the processing site in the coordinates of the global or local navigation system, obtaining information about the digitized relief of the processing site 7, as well as the position of reference objects 5 (6) within the processing site 7, see, for example, FIG. 1. For mobile reference objects 5a, zones 46 of their possible location are determined or set, see, for example, FIG. 7. As reference objects 5 (6) real objects are used, for example, trees, buildings, elements of urban or industrial infrastructure, as well as mobile objects, for example, train cars, cars, agricultural machinery. With respect to reference objects 5 (6), a non-empty set of targets 3 (4) is determined, each of which is defined by a line of finite length in space relative to some reference object 5 (6). This relative determination of targets is important, since not all targets can be determined in some physical way from the board of an unmanned aerial vehicle 1. For example, the target can be located inside the object or outside of it, and out of sight from the unmanned vehicle. The length of the target can be zero, that is, the target can be represented by a single point.

For each target 3 (4), a group of application parameters is specified, including the liquid dose and one or two of jet phases, 21 and/or 22, in which the liquid can reach the target 3 (4). Also, the distribution of the liquid dose along the target line is set either by specifying the absolute amount of liquid at one or more of its points, or, for a target of any non-zero finite length, a given dose of liquid is distributed along the length of the target by specifying the amount of liquid per unit length for each point of the target. Additionally, the group of target application parameters is supplemented with an indicator of the need for application when detecting the marker substance or the liquid itself on the target and/or on the object. For example, the presence of a marker substance on a reference object can cancel processing of each target defined relative to it. In some specific embodiments, the group of target application parameters is supplemented with other parameters, for example:

azimuth range and/or angle range 45 between the horizon 25 and the direction of delivery of liquid to the target 3, see FIG. 5;

area relative to the reference object 5 (6), in which the unmanned aerial vehicle 1 is prohibited to be located;

area relative to the reference object 5 (6), in which the unmanned aerial vehicle 1 is recommended to be located.

For each target 3 (4) from a set of targets for application and a group of application parameters associated with it, a set of application trajectories 44 with a series of controlled ejections of directed continuous liquid jets 2 is determined, such that processing of targets 3 (4) in accordance with the specified parameters is provided and performed by series of controlled ejections of directed continuous jets from unmanned aerial vehicle 1 in its motion along the selected application trajectory 44. Said trajectory 44 is understood as a segment of a continuous line in space, at each point of which the mutual position and orientation of unmanned aerial vehicle 1 and the target 3 (4) is provided, as well as direction of the velocity vector 23 of ejecting liquid jet 2, which together ensure that the target 3 (4) is reached by the jet 2 in any of the jet phases 21 and/or 22 specified by the application parameters. Examples of application are shown in FIGS. 5, 6, 7 and 12, and schematically shown in FIGS. 8, 9, 10 and 11.

Figure 8:
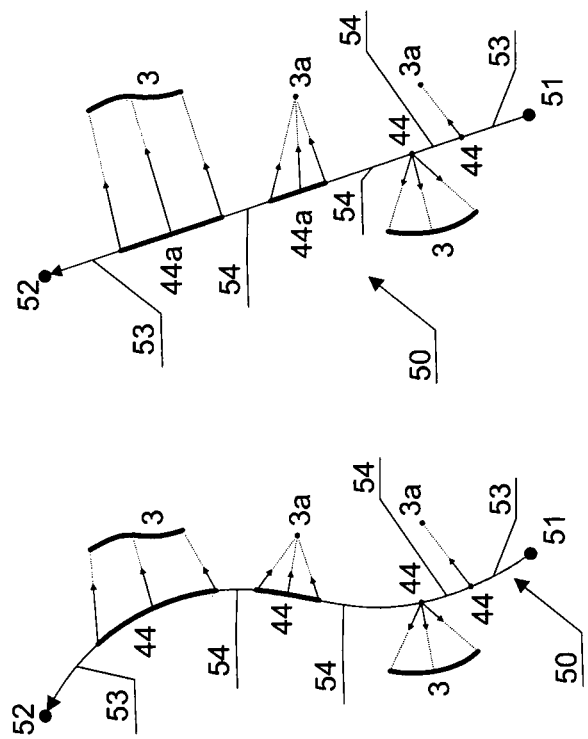
FIGS. 8 to 11. Schematic view of application trajectories and routes of unmanned aerial vehicle motion.
Figure 9:
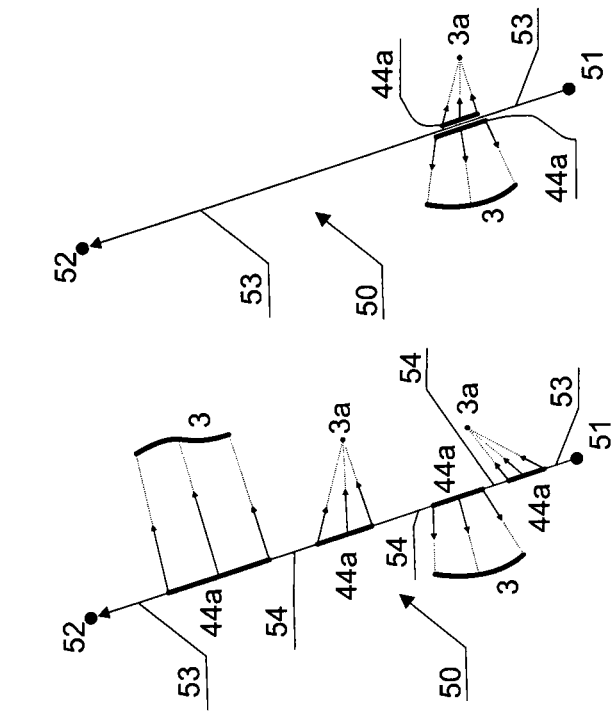
Figure 10:
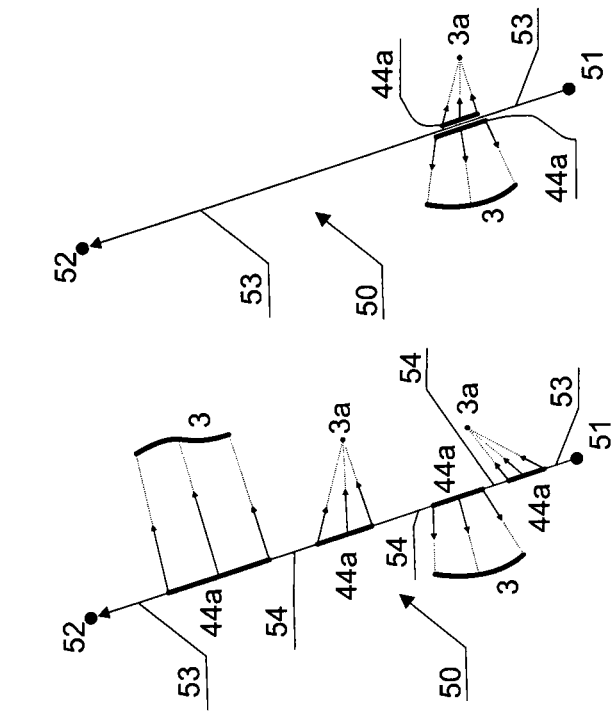

Application trajectories 44, shown on FIG. 8, are not optimal, since they are either curved or point-like. Such application trajectories are associated with additional energy consumption for acceleration (changing the velocity vector of an unmanned aerial vehicle). FIG. 9 shows more optimal application trajectories—two of them are rectilinear 44a. However, on a couple of them, namely, application trajectories 44, the unmanned aerial vehicle 1 has a zero heading speed, which is not optimal. FIG. 10 shows the preferred embodiment of the application trajectories 44a—they are all rectilinear and with a constant heading speed of the unmanned aerial vehicle 1 along them.

Optimally, for each target 3 (4), the application trajectories 44 are selected with a constant heading speed of the unmanned aerial vehicle 1 along them and, preferably, rectilinear as 44a, see FIG. 10.

The number of jets in the target 3 (4) application series is determined considering the guaranteed time of stable continuous operation of the controlled ejection generator(s) 19 of continuous jet 2 and the presence of obstacles on the way to the target 3 (4) of one calculated continuous jet 2, providing the target processing according to the specified application parameters from the unmanned aerial vehicle 1 moving along the target application trajectory 44. The total length of the application trajectory 44 is determined based on the dose set for the target 3 (4), its distribution along the target, the heading speed of the unmanned aerial vehicle 1 and the liquid flow rate when ejecting the jet(s) 2.

Even the selection of optimal application trajectories 44a for target 3 (4) can include a large number of options.

Then it is proceeded towards generating of unmanned aerial vehicle routes 50; see FIGS. 8, 9, 10 and 11. The motion of the unmanned aerial vehicle 1 along the target 3 (4) application trajectory 44 is defined as the application state 44; the presence of the unmanned aerial vehicle in a stationary state in one of the service sites 12, 13 or 14 is defined as the idle state 51 and 52; the motion of the unmanned aerial vehicle 1 between the application trajectories 44 is defined as the transit state 54; other motions are defined as the maintenance state 53. The sequence of unmanned aerial vehicle 1 states, beginning with the idle state 51 and ending with the idle state 52, is determining the route 50 of the unmanned aerial vehicle 1 and the application states 44 comprised in the route determine the set of targets, corresponding to the route, wherein for each unmanned aerial vehicle 1 in the maintenance state 53, preceding the first application state 44, the amount of liquid, corresponding the route 50, in liquid storage tank(s) 18 is prescribed to be provided by directing it to one of refilling sites 13, and the energy level in replaceable energy sources 20, corresponding the route, is prescribed to be provided by directing it to one of energy sources replacement sites 14.

Processing of a set of targets 3 (4) is planned by one or more unmanned aerial vehicles 1 during one session, comprising one or more routes 50, each assigned for processing a subset of targets by one of the unmanned aerial vehicles 1, by including the appropriate application states 44 in its route.

Each unmanned aerial vehicle 1 is equipped with one or more liquid storage tanks 18 and one or more controlled ejection generators 19 of a directed liquid jet 2, which are provided with liquid from the corresponding tanks 18. During the motion of the unmanned aerial vehicle 1 along the target 3(4) application trajectory 44 the angular stabilization in one or more planes is provided for the controlled ejection generator(s) by controlling the attitude of the unmanned aerial vehicle 1 carrying them and, optionally, configuring additional dimensional gimbals 33 by means of which the controlled ejection generator(s) is (are) mounted on unmanned aerial vehicle 1.

Figure 11:
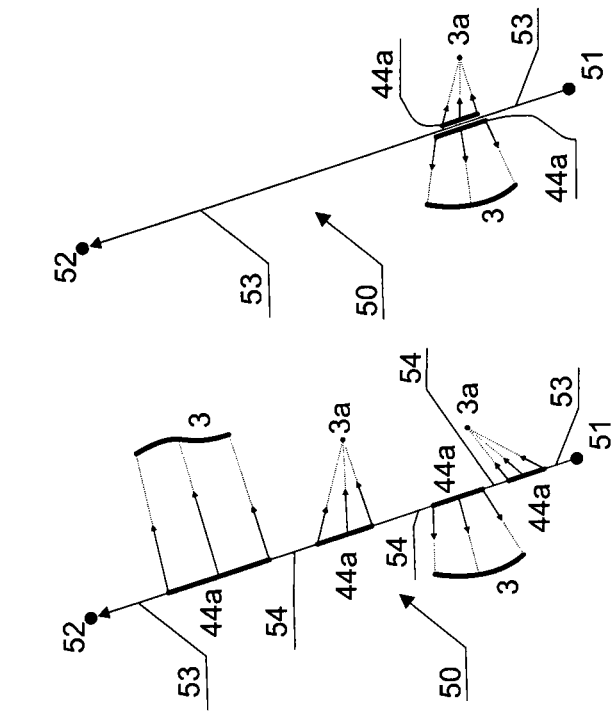
Figure 12:
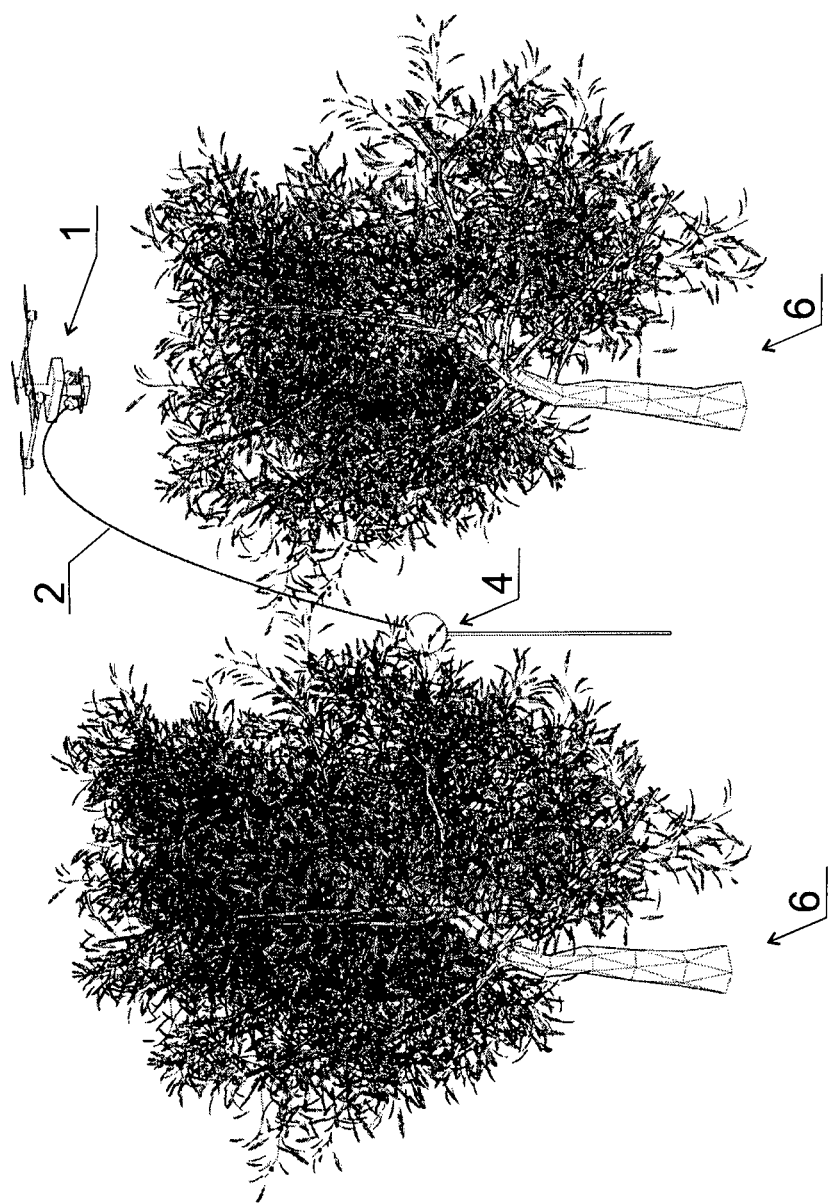
FIG. 12. Delivery of liquid to the target 4 between reference objects 6.

When generating session routes 50 for unmanned aerial vehicle 1, equipped with two or more controlled ejection generators, as in FIGS. 1 and 4, application trajectories are selected from a set of possible application trajectories 44, combined into a continuous linear section of the route with a constant heading speed of the unmanned aerial vehicle along it, and, preferably, rectilinear, see FIG. 11. For a route 50 with two or more application states 44, such application trajectories 44a are selected from a set of possible application trajectories, that are capable to fit into the shortest and straightest route, preferably, with constant heading speed of unmanned aerial vehicle 1 along its maximum part, see FIGS. 10 and 11. For unmanned aerial vehicle 1 on its last route 50 in the session in the maintenance state 53, following the last application state 44, the direction of unmanned aerial vehicle 1 is prescribed towards one of the refilling sites 13 to drain residual liquid from the liquid storage tank(s) 18 and/or to rinse the liquid storage tank(s) 18 and, optionally, the controlled ejection generators 19 together with corresponding liquid subsystems 26. One of the possible options for generating session routes 50 can be based on weight coefficients. For example, for a session of processing a set of targets 3 (4) determined relative to stationary reference objects 5 (6) by one or more unmanned aerial vehicles 1, the following should be determined:

weight coefficients for the stay of the unmanned aerial vehicle 1 in each state 51, 52, 53, and 54 of unmanned aerial vehicle during the selected unit of time;

amplifying multipliers for intervals of motion with acceleration;

weakening multiplier, inversely proportional to the remaining amount of unused liquid;

as well determining application trajectories 44a, collectively grouped into a plurality of routes, which is characterized by the minimum sum over the routes of integral values over time of the product of weight coefficients by amplifying and weakening multipliers along individual routes.

After forming the session, namely, the set of routes, the traffic of unmanned aerial vehicles, allocated for the execution of the session, is dispatched by the control station 10, and maintenance of unmanned aerial vehicles is performed at the service sites 12, 13 and 14 of the service infrastructure 11. Routes are distributed between the involved unmanned aerial vehicles 1 in such a way that the total time spent by all unmanned aerial vehicles 1 in the idle state 51 and 52 is minimal. Maintenance of the unmanned aerial vehicles 1 is comprising placement of the unmanned aerial vehicle 1 awaiting departure or having completed its flight in regular or emergency situation at a waiting site 12. In case of an emergency situation on unmanned aerial vehicle 1, its current route 50 is aborted and it is directed to the nearest waiting site 12 or, alternatively, it is landed as safely as possible outside the service sites 12, 13, or 14.

The given dose of liquid for the target 3 (4) is provided by configuring and, optimally, controlling the flow of liquid, ejected onto the target 3 (4) and controlling the time of ejection of each jet from a series of jets. The optimal embodiment of flow control is the liquid flow adjustment by controller 27 by controlling the pump 30, considering feedback from the flow meter 38. The optimal embodiment of controlling by jet ejection time is to control the delivery device controller 27 by jet ejection controller 28.

The relative position of the unmanned aerial vehicle 1 and the application area 3 (4) is characterized by the difference in altitudes and the horizontal distance between them, while direction of jet ejection is characterized by the angle between the direction of ejection 24 and the horizon 25, as shown in FIG. 2, and the azimuth of the application area relative to the unmanned aerial vehicle 1. Besides, using the relative position of unmanned aerial vehicle 1 and the application area 3 (4), during the entire time of application onto the target, a correction is determined for the velocity vector of unmanned aerial vehicle relative to the application area and, optionally, for specified or measured wind velocity vector. When processing targets 3b, determined relative to mobile reference objects 5a, the mutual position of the unmanned aerial vehicle 1 and the reference object 5a is provided using information from the means for detection and tracking of objects 47, FIG. 7.

It should be noted that the proposed technical solution is designed to be well combined and to be used with the invention "Method for a liquid jet formation and ejection and devices for use in said method", which is the subject of separate parallel application by the same Applicant (priority application LT2021 512).

Specific examples of the embodiments of above disclosed method and system explain the invention, but do not limit the scope of protection.

Example 1

In one of the principal embodiments the system proposed is used to control fruit flies in groves of fruit trees by processing trees or special traps installed between them with poisonous insecticide baits. The targets are either trunks or large branches of trees, or special traps determined relative to the trees themselves or, in case of traps, relative to the grove. For each tree the group of application parameters comprises a non-flight zone around the crown of the reference tree, as well as recommended flight corridors for unmanned aerial vehicles. Corridors are usually allocated in the aisle, and unmanned vehicles do not affect the crowns of trees with their descending air flows, do not break branches and do not knock down fruits. Flying in dedicated corridors also prevents damage to trees in emergency situations. The application is performed by a series of jet ejections along a ballistic trajectory directed to tree trunks. The jet penetrates well into the crown with giant droplets that stick to the trunk and large branches of the tree. Alternatively, the jets are directed to special traps installed between the trees. The usual dose of liquid is 20-25 mL per tree. Also, the device for delivering liquid, installed on unmanned aerial vehicle, is equipped with several generators directed on different sides of the route, formed to process trees from both sides in one span in the aisle. Since the routes are laid optimally, unmanned aerial vehicles for most of the route move in a straight line with a constant heading speed and, accordingly, consume energy optimally and finish the session as quickly as possible.

In this example, the controller 27 of the device 17 for delivering liquid establishes prohibition for jet ejection above the safe altitude of motion of the unmanned aerial vehicle, established by regulatory acts, which really ensures a high level of application safety.

Moreover, ejection of jets eliminates the drift of liquid on the way from unmanned vehicle to the target, thereby reducing the losses of liquid and not polluting the environment. The economic effect is also obvious. For example, fruit flies damage up to 100% of the olive crop in certain years, leading to a loss of more than 30% of the cost due to a decrease in the class of oil extracted from them or to a loss of more than 20% of the cost of table olives annually.

Example 2

In another principal embodiment, the proposed solution is used to deliver repellents to bulls grazing freely on large pastures. The targets are the lines along the backs of the animals, determined relative to the actual bodies of the animals. Since the animal is mobile, unmanned aerial vehicle is equipped with means for detecting the presence of marker substance and means for detection and possible additional further tracking of individual animals. The repellent is delivered in small doses, by the giant droplet phase, from the top and side position, which does not cause fright in the animal. Marker substance is added to the repellent, such as oxybenzone (benzophenone-3, BP-3), which absorbs ultraviolet light and is clearly visible on the corresponding spectral images of the means for detecting the presence of the marker substance. A thermal imager—special image sensor in the long-wave infrared range—is used as means for detection and possible further tracking of individual animals. Unmanned aerial vehicle reaches a pasture, defined in the coordinates of the global navigation system, and searches for the nearest bull without a detectable amount of marker substance on its back or sides. Then, tracking position of the animal, unmanned aerial vehicle takes the correct relative position, ejects one liquid jet and checks the fact that the liquid is delivered to the animal's body. Then it proceeds to the processing of the next animal. The herd is processed by several small unmanned aerial vehicles simultaneously in a fully autonomous mode. The size of unmanned aerial vehicle and the volume of the tank are selected in such a way, that the noise created by its motor system does not frighten animals and does not attract their attention. Currently, this is a topical issue, for example, in Brazil, where insects lead to the loss of 183 liters of milk from a cow and 41 kg of bull weight.

The advantages of the method and system as described are:

- driftless, practically no liquid deflection on the way to the target;
- precise delivery of small doses of liquid;
- high degree of optimization of processing multiple targets in one session;
- minimal impact on the application objects, since the processing is performed from a safe distance for the object, usually from the top and side positions;
- rational use of energy with preferential motion at a constant speed along straight sections of routes;
- applicability for target application defined relative to both stationary and mobile reference objects;
- easy-to-use device for delivering liquid with the possibility of automatic refilling and rinsing, as well as with the possibility of entirely replacing and disposing the tank with all the liquid subsystems connected to it, providing reliable, convenient and highly ecological maintenance of the entire system.

INDUSTRIAL APPLICABILITY

The proposed complex technical solution can be used in agriculture, animal husbandry and other industrial areas, where is a need for remote targeted delivery of small doses of any liquid agents according to a specified program from unmanned aerial vehicles.

The main application is the processing of fruit trees with poisoned baits for insect control in agriculture by remote targeted delivery of small doses of special liquids.

Devices and systems based on the above method can be used to deliver animal repellents, pheromones to attract animals to required places, to apply to the perimeters of protected areas with repellent substances, to mark the area or mobile or immovable objects, for example, vehicles.

LIST OF POSITIONS

1 unmanned aerial vehicle
2 liquid jet
3 application area, target on or in the reference object
3*a* zero-length target
3*b* target on or in a mobile reference object
4 application area, target outside the reference object
5 reference object with a target defined relative to it and located on or in it
5*a* mobile reference object
6 reference object, wherein the target defined relative to it, is outside of it
7 processing site
8 coverage area of global or local navigation system
9 source of information on application area
10 control station
11 service infrastructure
12 waiting site
13 refilling site
14 energy sources replacement site
15 unmanned aerial vehicle propulsion system
16 unmanned aerial vehicle controller
17 device for delivering liquid by ejecting continuous jet
18 liquid storage tank
19 controlled generator
19*a*, 19*b*, 19*c*— generator in the motion of unmanned aerial vehicle along the application trajectory
20 replaceable energy source
21 continuous jet phase
22 giant droplet phase
23 velocity vector of liquid jet ejected by the generator
24 angle between the horizon and velocity vector of ejected jet
25 horizon
26 liquid subsystem
27 delivery device controller
28 jet ejection controller
29 means for reducing liquid turbulence and/or aligning liquid flow
30 means for supplying liquid to the generator, for example, a pump
31 pressure pulsation damper
32 one or more dimensional gimbal
33 gimbal's orientation sensors unit
34 vibration damper
35 means for stirring liquid in the tank/tank stirrer
36 controlled valve
37 controlled valve drive
38 flow meter
39 temperature sensor
40 tank throat
41 drain, fill or drain and fill valve
42 tank liquid level sensor
43 connecting tubes
44 application trajectory, application state
44*a* rectilinear application trajectory, application state
45 angle of liquid delivery onto the target
46 mobile reference object location zone
47 means for detection and possible additional further tracking of reference objects
48 field of vision by means of detection
49 coordinate system of a mobile reference object
50 unmanned aerial vehicle route
51 initial idle state
52 final idle state
53 maintenance state
54 transit state

The invention claimed is:

1. A method for delivering liquid by ejecting a directed continuous jet, the method comprising:

obtaining information about a processing site;

determining application areas based on the obtained information about the processing site;

delivering liquid by a controlled ejection of directed continuous jet onto determined application areas from an unmanned vehicle directed to them; and maintaining of the unmanned vehicle by a service infrastructure, wherein obtaining information about the processing site (7) is comprising formation of a plurality of reference objects (5,6), regarding which a set of application areas (3) and, accordingly, a set of application targets are determined, wherein the unmanned vehicle, delivering liquid by a controlled ejection of directed continuous jet, is an unmanned aerial vehicle (1), and processing of application areas is performed by one or more unmanned aerial vehicles, wherein, for each application target (3) a group of application parameters is specified, and, depending on the application target and parameters specified for it, a set of application trajectories (44) with a series of controlled ejections of directed continuous liquid jets (2) is determined by a segment of a continuous line in space, at each point of which mutual position and mutual orientation of the unmanned aerial vehicle(s) (1) and the target (3,4) and a direction of the continuous jet ejection are provided, which together ensure the target (3,4) being reached by the directed continuous jet (2) in any of the jet phases (21,22) specified by the application parameters, wherein processing of application targets (3,4) in accordance with the specified application parameters is performed by series of one or more controlled ejections of directed continuous liquid jets (2) from the unmanned aerial vehicle (1) in motion along the selected application trajectory (44) for the targets (3,4) on a route (50), generated for given unmanned aerial vehicle (1), wherein delivery of the liquid is controlled by setting or correcting direction and, optionally, the speed and duration of the ejection of a directed continuous liquid jet (2), wherein the motion of unmanned aerial vehicle (1) along the target application trajectory (44) is defined as an application state (44), the motion of the unmanned aerial vehicle (1) between the application trajectories is defined as a transit state (54), and other motions are defined as a maintenance state (53), and the presence of unmanned aerial vehicle (1) in a stationary state on one of service sites defined as idle state (51,52), wherein sequence of states of unmanned aerial vehicle, beginning and ending with the idle state (51,52), is determining the route (50) of the unmanned aerial vehicle, and according to application states comprising the route, the set of targets (3,4) corresponding the route (50) is determined, and wherein processing of set of targets (3,4) is performed by one or more unmanned aerial vehicles (1) during one session, comprising of one or more routes (50), each being assigned for processing a subset of targets (3,4) by one of unmanned aerial vehicles, by including appropriate application states in its route (50), wherein for a route (50) with two or more application states such application trajectories (44) are selected from a set of possible application trajectories that are capable to fit into the shortest and straightest route (50), optimally, with a constant heading speed of the unmanned aerial vehicle (1) along its longest part, wherein for session of processing a set of application targets (3,4), determined relative to stationary reference objects (5,6), by one or more unmanned aerial vehicles (1), the following is determined:
weight coefficients for the stay of unmanned aerial vehicle (1) in each state of the unmanned aerial vehicle during the selected unit of time;
amplifying multipliers for intervals of motion with acceleration; and
weakening multiplier, inversely proportional to the remaining amount of unused liquid,
wherein delivery paths are determined, which are collectively grouped into a plurality of routes (50), characterized by the minimum sum over the routes of integral values over time of the product of weight coefficients by amplifying and weakening multipliers along individual routes (50), and
wherein a liquid for delivering by the controlled ejection of the directed continuous jet comprises an active application agent and, optionally, a marker substance, capable of confirming the fact of delivery of liquid to the target (3,4), equipping the unmanned aerial vehicle (1) with linked with the controller (16) for detecting the presence of marker substance on the target and/or reference object; and the reference objects (5,6) and/or application targets (3,4), defined relative to them, are optionally marked with marker substances prior to application, supplementing a group of application parameters with an indicator of the need for processing, when detecting the marker substance on the target (3,4) and/or reference object (5,6), with respect to which it is determined; wherein the liquid itself is used as the marker substance, if its presence on the reference object (5,6) and/or target (3,4) is detectable, or the marker substances are added to the liquid.

2. The method for delivering liquid by ejecting the directed continuous jet according to claim 1, wherein the reference objects (5,6) are characterized by their spatial position and orientation or by spatial area of their possible location in a coordinate system of global or local navigation system; wherein for each target (3,4) the application trajectory (44) with a constant heading speed of the unmanned aerial vehicle along it, and, optimally, rectilinear (44*a*), is selected from the set of possible application trajectories (44) of that target (3,4); the application parameters are comprising a dose of liquid and one or both of the jet phase(s) (21, 22) acceptable for delivering the dose onto the target (3,4), wherein the phase(s) is (are) selected from the group, comprising a continuous jet phase (21) and a phase of giant droplets (22) formed in the break-up process of the continuous jet phase; and the directed continuous jet (2), optimally, is laminar.

3. The method for delivering liquid by ejecting the directed continuous jet according to claim 1, wherein processing of application areas (3,4) is performed by one or more unmanned aerial vehicles (1), each equipped with one or more liquid storage tanks (18) and one or more generators (19) for controlled ejection of a directed liquid jet (2), providing liquid for the generator(s) (19) from the respective tank(s) (18), wherein during the motion of unmanned aerial vehicle (1) along target application trajectory (44) an angular stabilization is provided in one or more planes by controlling attitude of unmanned aerial vehicle (1) carrying them and, optionally, by configuring of additional gimbal(s) (32) by means of which the controlled ejection generator(s) (19) is (are) mounted on the unmanned aerial vehicle (1), wherein generating session routes (50) for unmanned aerial vehicle equipped with two or more controlled ejection generators (19), application trajectories (44) are selected from a set of possible application trajectories (44) that are combined into a continuous linear part of the route (50) with a constant heading speed of the unmanned aerial vehicle (1) along it and, optimally, rectilinear; and
wherein a number of directed continuous jets (2) in target application series is determined by considering guaranteed time of stable continuous operation of the controlled ejection generator(s) (19) and the presence of obstacles on the way to the target (3,4) of one calculated directed continuous jet (2), providing target processing according to the specified application parameters from the unmanned aerial vehicle (1) moving along the target application trajectory (44).

4. The method for delivering liquid by ejecting the directed continuous jet according to claim 1, wherein the reference object(s) (5,6), relative to which a set of application targets (44) for processing by one of unmanned aerial vehicles (1), singly or in groups, is (are) determined and, optionally, is (are) further tracked according to images from an image sensor and/or a range (TOF, Time-Of-Flight) image sensor installed on the unmanned aerial vehicle, with determining for unmanned aerial vehicle (1) and each reference object (5,6) their mutual position and mutual orientation.

5. The method for delivering liquid by ejecting a continuous jet according to claim 1, wherein the group of target application parameters is further supplemented in such a way, that for an application target (3,4), which is a line of any finite length, including zero, a given dose of liquid is distributed along its length by specifying an absolute amount of liquid at one or more of its points, or for an application target (3,4) of any non-zero finite length a given dose of liquid is distributed along its length by specifying the amount of liquid per unit length for each point of the target (3,4), wherein the given dose is provided by configuring and, optimally, controlling the flow of liquid ejected into the target, and controlling the time of ejection of each directed continuous jet (2) from series of jets.

6. The method for delivering liquid by ejecting the directed continuous jet according to claim 1, wherein the group of target application parameters is optionally supplemented with one or more restrictions, selected from the group comprising:
 azimuth range and/or an angle range between the horizon (25) and direction of delivery of the liquid to the target (3,4);
 space relative to the reference object (5,6), in which unmanned aerial vehicle (1) is prohibited to be located; and
 space relative to the reference object (5,6), in which the unmanned aerial vehicle (1) is recommended to be located.

7. The method for delivering liquid by ejecting the directed continuous jet according to claim 1, wherein applying onto the targets set by the session is performed by distributing routes (50) between involved unmanned aerial vehicles (1) in such a way, that the total time spent by all unmanned aerial vehicles in the idle state (51, 52) is minimal;
 wherein each unmanned aerial vehicle (1) in the maintenance state (53) preceding the first application state, the amount of liquid corresponding the route (50) in liquid storage tank(s) (18) is prescribed to be provided by directing it to one of refilling sites (13), and energy level in replaceable energy sources corresponding the route is prescribed to be provided by directing it to one of energy sources replacement sites (14); and
 wherein, for unmanned aerial vehicle (1) on its last route in the session in the maintenance state (53), following the last application state (44), direction of unmanned aerial vehicle (1) is prescribed towards one of the refilling sites (13) for draining residual liquid from liquid storage tank(s) (18) and/or rinsing of liquid storage tank(s) and, optionally, of controlled ejection generators (19).

8. The method for delivering liquid by ejecting the directed continuous jet according to claim 1, wherein determining the relative position of unmanned aerial vehicle (1) and application area is characterized by the difference in altitudes and horizontal distance between them, while direction of the jet ejection is characterized by the angle (24) between the direction of jet ejection and the horizon (25) and the azimuth of the application area relative to unmanned aerial vehicle (1), and using the relative position of unmanned aerial vehicle (1) and the application area during entire time of application onto the target (3,4), a correction being determined for velocity vector (23) of unmanned aerial vehicle (1) relative to the application area and, optionally, for specified or measured wind velocity vector.

9. The method for delivering liquid by ejecting the directed continuous jet according to claim 1, wherein, in case of emergency situation on unmanned aerial vehicle (1), its current route (50) is aborted and it is directed to the nearest waiting site (12) or, alternatively, performing landing as safe as possible outside the service or waiting sites (12).

10. A system for delivering liquid by ejecting a directed continuous jet, the system comprising:
 a source of information on application areas;
 an unmanned vehicle equipped with a controller and carrying a device for delivering liquid by ejecting a directed jet, comprising a liquid storage tank and a generator for controlled ejection of a directed liquid jet;
 an unmanned vehicle service infrastructure; and
 a control station linked to the source of information on processing site, the unmanned vehicle controller and the service infrastructure,
 wherein the source of information (9) on application areas comprises information about a set of specified targets (3, 4) determined relative to a set of reference objects (5) located in the processing site (7), covered by the coverage area (8) of local or global navigation system,
 wherein the unmanned vehicle is one or more unmanned aerial vehicles (1), each being means for providing altitude and angular stabilization in one or more planes for one or more installed on the means devices (17) for delivering liquid by ejecting a directed liquid jet during time of jet (2) ejection by generator (19), wherein unmanned aerial vehicle controller (16) is equipped with means for accurate navigation of the local or global navigation system and means for determination of the orientation and course, including compass or magnetometer,
 wherein the device (17) for delivering liquid is configured for series of one or more ejections of directed continuous, optimally laminar, liquid jet(s) (2) to the target (3, 4) on the corresponding the target application trajectory (44) of the unmanned vehicle (1) route (50), wherein, optionally, the delivery device controller (27) is configured to set or to correct direction, and, optionally, the speed and duration of the jet ejection, wherein device (17) for delivering liquid is equipped with its own delivery device controller (27) linked to the unmanned aerial vehicle controller (16) and the control station (10), and is equipped with one or more generators (19) for controlled ejection of liquid jet, wherein each generator (19) is connected to a liquid storage tank (18) by means of a controlled liquid subsystem (26), or several jet ejection generators (19) are connected to the tank (18) by means of a single controlled liquid subsystem (26), wherein tank (18) and controlled liquid subsystem(s) (26) connected to it are combined into one common easily replaceable and entirely disposable unit, and
 wherein the liquid for application onto the target is comprising an active application agent and, optionally, a marker substance, capable of confirming the fact of delivery of liquid to the target, and the unmanned aerial vehicle (1) is optionally equipped with linked with the controller (16) means for detecting the presence of marker substance on the target and/or reference object;

wherein the control station (10) comprises:
- means for generating unmanned aerial vehicles routes (50) laid through the application trajectories (44) of each target from the set of targets;
- means for controlling the motion of the unmanned aerial vehicles along the routes (50) linked with the means for generating the routes;
- linked with the means for controlling the motion means for communication with unmanned aerial vehicles controllers (16), with delivery device (17) controller (s) (27) and, optionally, with refilling sites (13) and/or energy sources replacement sites (14);

wherein the service infrastructure (11) comprises one or more service sites, comprising one or more energy sources replacement sites (14), one or more liquid refilling sites (13), one or more waiting sites (12), located on a common platform or distributed individually or in groups, optionally, in the form of multifunctional service sites, configured as a stationary and/or mobile ground station, wherein refilling site (13) is equipped with a tank for liquid for application and, optionally, mixing reactors for obtaining a specified liquid directly at the refilling site.

11. The system for delivering liquid by ejecting a directed continuous jet according to claim 10, wherein the unmanned aerial vehicle (1) is made in the form of a multi-rotor aerial vehicle with vertical takeoff and landing, and is configured in such a way that the air flows, generated by the rotors of the unmanned aerial vehicle in flight, and the liquid jet ejected by the generator do not interfere.

12. The system for delivering liquid by ejecting a directed jet according to claim 10, wherein each of the jet generators (19) is installed on the device (17) for delivering liquid by directed continuous jet by means of a vibration damper (34) and/or gimbal (32) for one or more angles with linking of orientation sensor unit (33) of the gimbal (32) to the orientation of the generator (19);
- wherein the outlet of the generator (19) is equipped with the jet ejection controller (28), which diverts liquid, not used for ejection onto the target, into corresponding liquid storage tank (18); and
- wherein the tank (18) is optionally further equipped with a tank stirrer (35) in order to avoid sedimentation or delamination.

13. The system for delivering liquid by ejecting a directed continuous jet according to claim 10, wherein the controlled liquid subsystem (26) is equipped with liquid pump (30) and, optionally, is equipped with pressure pulsation damper (31) for pressure pulsations generated by the pump (30), and
- wherein the controlled liquid subsystem (26) is further equipped with a liquid flow meter (38), which is a feedback sensor for the controller (27) of the device (17) for delivering liquid by ejecting a directed jet.

14. The system for delivering liquid by ejecting a directed continuous jet according to claim 10, wherein the device (17) for delivering is equipped with means for draining and removing liquid residues from the tank (18), with the possibility of rinsing the tank (18), the liquid subsystem (26) and, optionally, the jet ejection generator (19),
- wherein the device (17) for delivering liquid by ejecting a directed jet is equipped with a fill valve (41), optionally combined with means for draining and removing liquid residues from the tank (18), and
- wherein the device (17) for delivering liquid by ejecting a directed jet is made in the form of a removable payload module, installable on the unmanned aerial vehicle (1).

15. The system for delivering liquid by ejecting a directed continuous jet according to claim 10, wherein the device (17) for delivering is integrated into the unmanned aerial vehicle (1), wherein, optionally, the unmanned aerial vehicle controller (16) and the controller (27) of the device (17) for delivering liquid by a directed jet are combined.

16. The system for delivering liquid by ejecting a directed continuous jet according to claim 10, wherein the controller (27) of the device (17) for delivering liquid is establishing prohibition for jet ejection above the specified safe altitude of the unmanned aerial vehicle (1) motion.

17. The system for delivering liquid by ejecting a directed continuous jet according to claim 10, wherein the control station (10) has a distributed structure, wherein means for generating routes of unmanned aerial vehicles are located outside the processing site (7), and the means for traffic control and communication means are located within the processing site (7).

18. The system for delivering liquid by ejecting a directed continuous jet according to claim 17, wherein the means for generating routes of unmanned aerial vehicles are comprising:
- hardware and software computing resources for generating routes, optimally, a cloud or a remote relative to the processing site physical or virtual server, equipped with a network adapter, supporting known Internet protocols and connected to the Internet.

19. The system for delivering liquid by ejecting a directed continuous jet according to claim 17, wherein the means for traffic control are comprising:
- hardware and software computing resources for the implementation of traffic control, optimally, an industrial computer or controller, optimally, based on an ARM microcontroller(s) equipped with a network adapter, supporting known Internet protocols and connected to the Internet.

20. The system for delivering liquid by ejecting a directed jet according to claim 10, wherein the control station (10) is local, wherein all its components are combined into one functional device located within the processing site (7) and made in the form of a module for refilling site (13) or energy sources replacement site (14).

* * * * *